(12) United States Patent
Toyozumi et al.

(10) Patent No.: US 11,835,487 B2
(45) Date of Patent: Dec. 5, 2023

(54) ULTRASONIC INSPECTION OF EXTENTS OF VOIDS OR THE LIKE IN HEATED MATERIAL USING FLUID BLOWING

(71) Applicant: Teijin Limited, Osaka (JP)

(72) Inventors: Takashi Toyozumi, Osaka (JP); Hodaka Yokomizo, Osaka (JP); Makoto Ootsubo, Osaka (JP); Shuhei Suzuki, Osaka (JP); Akihiko Obata, Osaka (JP)

(73) Assignee: Teijin Limited, Osaka (JP)

( * ) Notice: Subject to any disclaimer, the term of this patent is extended or adjusted under 35 U.S.C. 154(b) by 457 days.

(21) Appl. No.: 16/979,330

(22) PCT Filed: Mar. 6, 2019

(86) PCT No.: PCT/JP2019/008948
§ 371 (c)(1),
(2) Date: Sep. 9, 2020

(87) PCT Pub. No.: WO2019/172338
PCT Pub. Date: Sep. 12, 2019

(65) Prior Publication Data
US 2021/0003538 A1 Jan. 7, 2021

(30) Foreign Application Priority Data
Mar. 9, 2018 (JP) .................................. 2018-043048

(51) Int. Cl.
*G01N 29/32* (2006.01)
*G01N 29/04* (2006.01)
(Continued)

(52) U.S. Cl.
CPC ............. *G01N 29/32* (2013.01); *B29C 55/06* (2013.01); *G01B 11/306* (2013.01);
(Continued)

(58) Field of Classification Search
CPC ........ G01N 29/32; G01N 29/04; G01N 29/28; B29C 55/06; G01B 11/306; G01B 17/025; G01B 21/30; G01B 11/30; G01B 11/25
(Continued)

(56) References Cited

U.S. PATENT DOCUMENTS

| 8,826,739 | B2 | 9/2014 | Matsumoto et al. | |
|---|---|---|---|---|
| 2011/0130890 | A1* | 6/2011 | Tojo | G01D 3/0365 73/1.01 |
| 2012/0186348 | A1* | 7/2012 | Matsumoto | G01B 17/025 73/597 |

FOREIGN PATENT DOCUMENTS

| CN | 1869109 B | * | 4/2011 |
|---|---|---|---|
| JP | 54054721 U | * | 9/1977 |

(Continued)

OTHER PUBLICATIONS

Translation JP-5344075 (Year: 2012).*
(Continued)

*Primary Examiner* — Mischita L Henson
*Assistant Examiner* — Monica S Young
(74) *Attorney, Agent, or Firm* — Banner & Witcoff, Ltd.

(57) ABSTRACT

The present invention provides a method for inspecting a material to be inspected using ultrasound waves, the method including the following step 201 to step 301, in which step 201 is performed in a condition where: the surface temperature of a material under inspection—atmospheric temperature>2° C., and inspection using ultrasound waves in step 301 satisfies: a refractive attenuation rate≤1.5%. Step 201: blowing a fluid from a blowing port onto the material to be inspected. Step 301: inspecting the material to be inspected using the ultrasound waves after step 201 or at the same time as the step 201.

19 Claims, 8 Drawing Sheets

(51) Int. Cl.
  *B29C 55/06* (2006.01)
  *G01B 11/30* (2006.01)
  *G01B 21/30* (2006.01)
  *G01B 17/02* (2006.01)
  *G01N 29/28* (2006.01)

(52) U.S. Cl.
  CPC ........... *G01B 17/025* (2013.01); *G01B 21/30* (2013.01); *G01N 29/04* (2013.01); *G01N 29/28* (2013.01)

(58) Field of Classification Search
  USPC .......................................................... 73/644
  See application file for complete search history.

(56) References Cited

FOREIGN PATENT DOCUMENTS

| | | | | |
|---|---|---|---|---|
| JP | S53-044075 | A | | 4/1978 |
| JP | 55155905 | U | * | 4/1979 |
| JP | 55155905 | U | * | 11/1980 ............ G06F 3/1211 |
| JP | S55-155905 | U | | 11/1980 |
| JP | 60259954 | A | * | 6/1984 |
| JP | S60-259954 | A | | 12/1985 |
| JP | S61-048359 | U | | 4/1986 |
| JP | 2000127099 | A | * | 5/2000 |
| JP | 2010205678 | A | * | 9/2010 |
| JP | 2012-154744 | A | | 8/2012 |
| JP | 5344075 | B1 | * | 11/2013 ............ G06F 3/1211 |
| JP | 7000518 | B2 | * | 2/2022 |
| WO | WO-2009022715 | A1 | * | 2/2009 ......... B29C 47/0019 |
| WO | 2010-013720 | A1 | | 2/2010 |

OTHER PUBLICATIONS

Translation JP-54054721 (Year: 1979).*
Translation JP_2000127099 (Year: 2000).*
Translation JP-55155905 (Year: 1980).*
Translation JP-5344075 (Year: 2013).*
May 2, 20191 - International Search Report—Intl App PCT/JP2019/008948.
May 24, 2020—(JP) Notice of Reasons for Refusal—App 2018-043048.
May 21, 2019—Written Opinion of the International Searching Authority PCT/JP2019/008948.
May 21, 2019—International Search Report—Intl App PCT/JP2019/008948.
May 24, 2019—(JP) Notice of Reasons for Refusal—App 2018-043048.

* cited by examiner

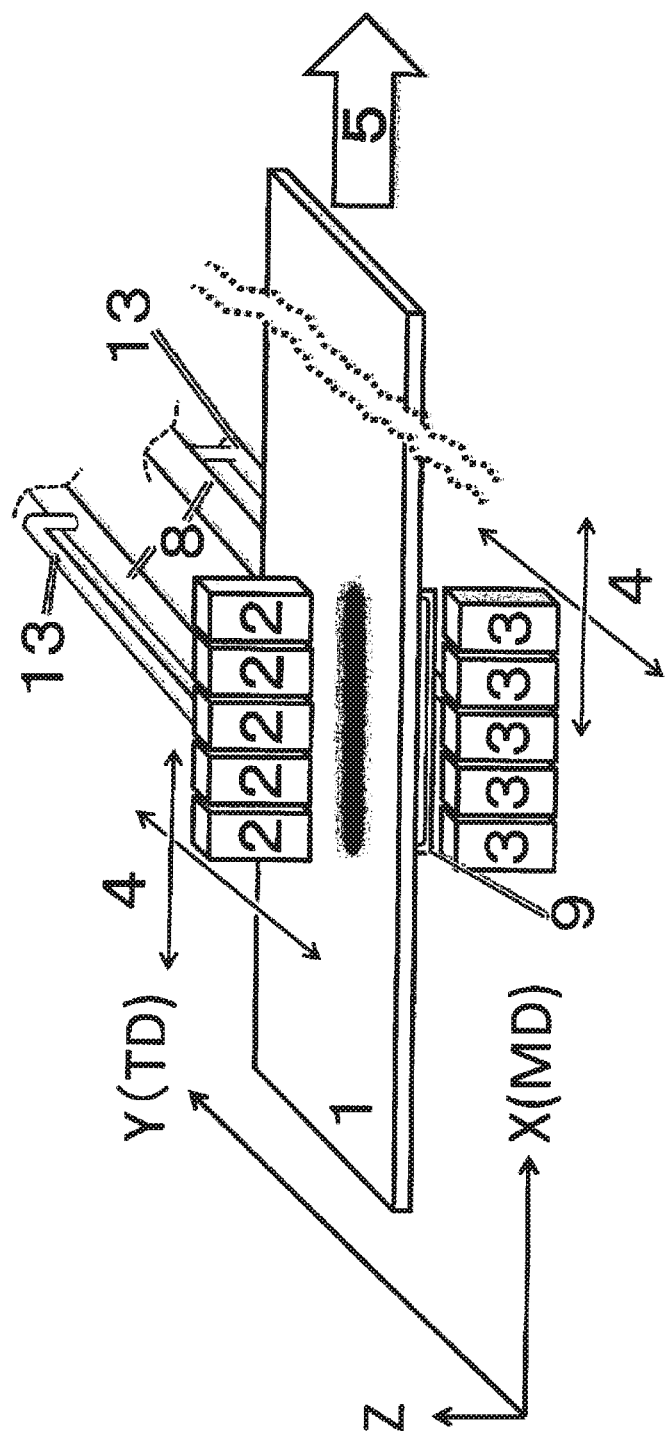

ULTRASONIC INSPECTION OF EXTENTS OF VOIDS OR THE LIKE IN HEATED MATERIAL USING FLUID BLOWING

CROSS REFERENCE TO RELATED APPLICATIONS

This application is a U.S. National Phase under 35 U.S.C. § 371 of International Application No. PCT/JP2019/008948, filed Mar. 6, 2019, which claims priority to Japanese Patent Application No. 2018-043048, filed Mar. 9, 2018, the entire contents of which is incorporated herein by reference.

TECHNICAL FIELD

The present invention relates to a method of inspecting a material to be inspected having a temperature higher than an ambient temperature using ultrasound waves, and a molding material manufacturing method that includes a method of inspecting a molding material as a material to be inspected using the inspection method.

BACKGROUND ART

In the industrial circles, a most typical nondestructive inspection method for materials is an inspection method using ultrasound waves. For example, Patent Literature 1 discloses a material inspection device using ultrasound waves. In the material inspection device, an ultrasound wave transmitter and an ultrasound wave receiver, which have directivity, are opposed to each other at two sides of a plate material, which is an object to be inspected, with a certain distance therebetween, the transmitter emits pulse-modulated ultrasound waves, the receiver opposed thereto receives the ultrasound waves through the plate material, and a signal processing circuit measures a propagation time of the ultrasound waves, thereby detecting an internal defect of the plate material, which is the object to be inspected, in a non-contact manner.

CITATION LIST

Patent Literature

Patent Literature 1: JP-A-60-259954

SUMMARY OF INVENTION

Technical Problem

However, the invention disclosed in Patent Literature 1 has not recognized a problem in a case of inspecting a material having a temperature higher than an atmospheric temperature of an inspection location due to immediately after manufacturing, processing or the like. The inventors have found that the air is heated in the vicinity of surfaces of the material to be inspected when the material to be inspected has a high temperature, and that the air in the vicinity of the surfaces has a different behavior in ultrasound wave propagation from atmospheric air at the inspection locations, particularly, air at one or both of a part of the inspection device which transmits ultrasound waves and a part of the inspection device which receives the ultrasound waves, and is stratified. Further, the inventors have found the following facts: such stratified air, as it were, is an air layer different from surrounding atmosphere at the inspection locations; there is an interface between the stratified air and the surrounding atmosphere; the interface does not form a constant surface and is always fluctuating; the ultrasound waves are reflected or refracted at the interface due to Snell's law when being transmitted to the fluctuating interface; and an echo intensity is significantly reduced in ultrasonic inspection due to the reflection or refraction as compared with a case where there is no different air layer.

Therefore, an object of the present invention is to provide an inspection method that is capable of appropriately and efficiently performing ultrasonic inspection on a material to be inspected having a temperature higher than an ambient temperature.

Solution to Problem

In order to solve the above problems, the present invention provides the following method.
1. An inspection method for a material to be inspected using ultrasound waves, including following processes 201 and 301, in which
the process 201 is performed in a condition where:
a surface temperature of a material to be inspected—an ambient temperature>2° C.; and
inspection using ultrasound waves in the process 301 satisfies:
a refractive attenuation rate in echo intensity measurement≤1.5%.
Process 201: blowing a fluid through a blowing port onto the material to be inspected.
Process 301: inspecting the material to be inspected using the ultrasound waves after the process 201 or at a same time as the process 201.
2. The inspection method according to the above 1, in which the inspection using ultrasound waves in the process 301 includes propagating the ultrasound waves on a surface of the material to be inspected where the fluid flows in the process 201.
3. The inspection method according to the above 1 or 2, in which the inspection using ultrasound waves in the process 301 includes: arranging at least one pair of ultrasonic probes facing each other with the material to be inspected in between without contacting the material to be inspected; transmitting the ultrasound waves from one of the ultrasonic probes; and receiving the transmitted ultrasound waves with the other ultrasonic probe.
4. The inspection method according to any one of the above 1 to 3, in which the ultrasound waves employed in the process 301 have a frequency of 100 kHz to 1000 kHz.
5. The inspection method according to any one of the above 1 to 4, in which the fluid blown onto the material to be inspected in the process 201 is at least one selected from a group consisting of air, water vapor, an inert gas, and mist-like water.
6. The inspection method according to any one of the above 1 to 5, in which the processes 201 and 301 are performed at the same time, and a difference between the surface temperature of the material to be inspected during inspection and the ambient temperature is 5° C. or more.
7. The inspection method according to any one of the above 1 to 6, in which the material to be inspected is used in a condition of:
a surface temperature thereof—the ambient temperature>2° C., and
the process 201 includes: replacing at least a part of a different atmosphere layer in contact with the surface of the material to be inspected with the fluid blown onto the material to be inspected in the process 201 to form a fluid atmosphere region, and the inspection using ultrasound waves in the process 301 is performed by propagating the ultrasound waves in the fluid atmosphere region.

8. The inspection method according to the above 7, in which the at least part of the different atmosphere layer is replaced with the fluid in a region within 3 mm from the surface of the material to be inspected to an outside of the material to be inspected to form the fluid atmosphere region.

9. The inspection method according to any one of the above 1 to 8, in which the material to be inspected is used in a condition where:

a surface temperature thereof—the ambient temperature>2° C., and the material to be inspected has different atmosphere layers contacting one face of the material to be inspected and the other face of the material to be inspected opposite to the one face the process 201 includes blowing the fluid onto the material to be inspected to replace at least a part of each different atmosphere layer with the fluid to form two or more fluid atmosphere regions, and the inspection using ultrasound waves in the process 301 includes propagating the ultrasound waves from one fluid atmosphere region on one face to another fluid atmosphere region on the other face.

10. The inspection method according to any one of the above 1 to 9, in which the fluid blown onto the material to be inspected in the process 201 has a flow velocity of 1 m/s or more in a direction parallel to the surface of the material to be inspected, and has a Reynolds number of 100,000 or less.

11. The inspection method according to any one of the above 1 to 10, in which an angle of a direction of the fluid blown onto the material to be inspected in the process 201 is within ±45° with reference to the surface of the material to be inspected.

12. The inspection method according to any one of the above 1 to 11, in which the material to be inspected has a thickness of 0.1 mm or more.

13. The inspection method according to any one of the above 1 to 12, in which the material to be inspected is at least one selected from a group consisting of magnesium, aluminum, iron, a glass fiber reinforced thermosetting resin, a glass fiber reinforced thermoplastic resin, a carbon fiber reinforced thermosetting resin, and a carbon fiber reinforced thermoplastic resin.

14. The inspection method according to any one of the above 1 to 13, in which the material to be inspected has a substantially plate shape.

15. The inspection method according to any one of the above 1 to 14, in which the material to be inspected is continuously supplied to a location where the inspection is performed using the ultrasound waves in the process 301.

16. The inspection method according to any one of the above 1 to 15, in which there is provided an interlocking mechanism configured to move the material to be inspected the ultrasonic probes while the inspection using ultrasound waves in the process 301, and configured to move the blowing port of the fluid in accordance with movement of the material to be inspected.

17. The inspection method according to any one of the above 1 to 16, in which the difference between the surface temperature of the material to be inspected and the ambient temperature is 5° C. or more before the fluid is blown, and the fluid is blown onto the material to be inspected until the difference decreases less than 5° C. in the process 201.

18. The inspection method according to any one of the above 1 to 17, in which the process 301 further includes: converting data of the inspection using ultrasound waves into an image; and determining pass or fail based on the image.

19. The inspection method according to any one of the above 1 to 18, in which the processes 201 and 301 are performed at the same time, and a direction of the fluid blown onto the material to be inspected in the process 201 is different from a direction of the ultrasound waves propagated at a time of inspecting the material to be inspected using the ultrasound waves in the process 301.

20. A molding material manufacturing method, including inspecting the molding material as the material to be inspected using the inspection method according to any one of the above 1 to 19.

The present invention includes:

an invention of an inspection method for a material to be inspected which uses the material to be inspected in a condition where: a surface temperature thereof—an ambient temperature>2° C., the process 201 of "blowing a fluid through a blowing port onto the material to be inspected", further includes blowing the fluid to replace at least a part of a different atmosphere layer contacting a surface of the material to be inspected with the fluid to form a fluid atmosphere region, and the process 301 of "inspecting the material to be inspected using ultrasound waves after the process 201 or at a same time as the process 201" includes performing the inspection using ultrasound waves by propagating the ultrasound waves in the fluid atmosphere region; and the inventions of the above 2 to 6 and 8 to 20 in which the above inspection method is regarded as the inspection method according to the above 1.

Advantageous Effects of Invention

By using the inspection method disclosed herein, it is possible to quickly and highly accurately perform ultrasonic inspection on a material to be inspected immediately after manufacturing or processing, such as one having a temperature higher than an ambient temperature. In particular, when the material to be inspected is a raw material, an in-process intermediate, or a product in continuous production and is subjected to online inspection, a highly reliable inspection result can be obtained without adversely affecting production efficiency.

BRIEF DESCRIPTION OF DRAWINGS

FIG. 5 is a schematic diagram illustrating an embodiment where a long rectangular sample is inspected by continuously performing operations of the processes 201 and 301 while transporting the long rectangular sample in an MD direction, using 5 pairs of ultrasonic probes and a fluid blow tube coupled to the 5 pairs of the ultrasonic probes via a coupling arm, the fluid blow tube having an outlet to which a thin wide-mouth nozzle is attached, a fluid blowing port thereof is interlocked with movement of the 5 pairs of ultrasonic probes in the MD direction or a TD direction, and ultrasonic inspection is performed while blowing the fluid from a close distance of an inspection location.

DESCRIPTION OF EMBODIMENTS

Figure 1:
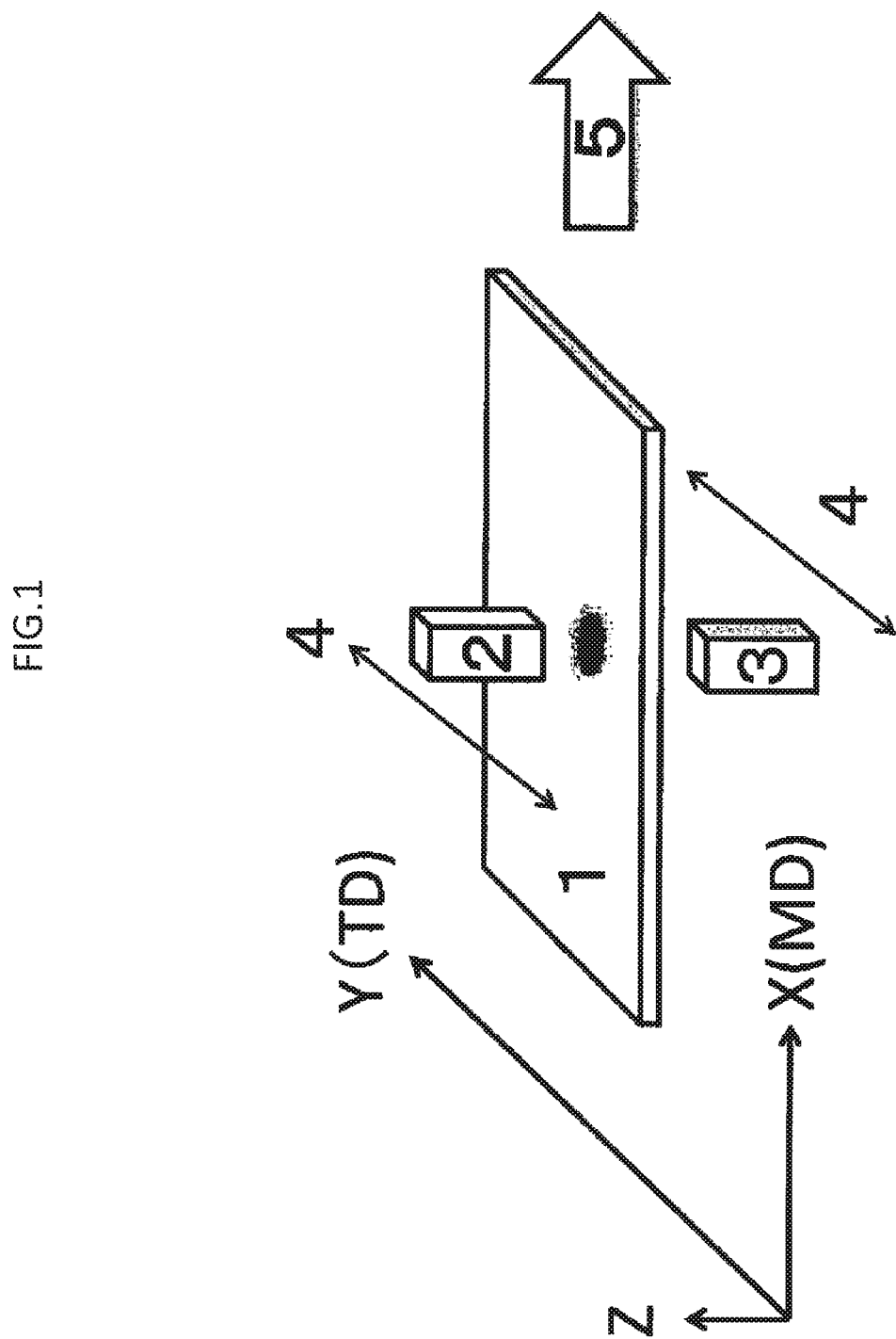
FIG. 1 is a schematic diagram illustrating an example of arrangement and moving directions of a flat plate shaped material to be inspected having a rectangular shape viewed from a thickness direction (hereinafter, may be abbreviated as a rectangular sample) and ultrasonic probes in a case where the material to be inspected is inspected using ultrasound waves. However, illustration of a holding device and a transport device for the material to be inspected, and illustration of a holding and moving device for ultrasonic probes are omitted.
Figure 2:
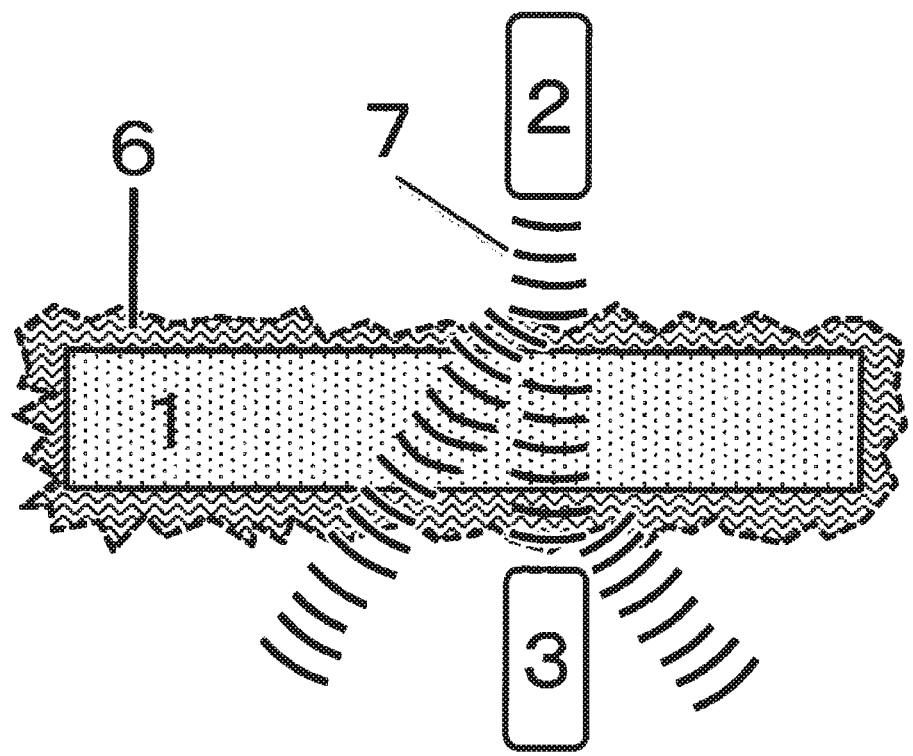
FIG. 2 is a schematic diagram illustrating the rectangular sample having a temperature exceeding an ambient temperature by more than 2° C. in a state where a different atmosphere layer is formed around the rectangular sample, which causes refraction of the ultrasound waves remarkably at a boundary between the ambient atmosphere and the different atmosphere layer at a time of inspection, based on observation of the material to be inspected from a side surface direction thereof (a direction substantially perpendicular to the thickness direction).

Here, as a method of inspecting a material to be inspected having a temperature higher than an ambient temperature efficiently and accurately using ultrasound waves, disclosed is an inspection method for a material to be inspected including the following processes 201 and 301, in which
the process 201 is performed in a condition where:
a surface temperature of the material to be inspected—the ambient temperature>2° C., and
inspection using ultrasound waves in process 301 satisfies:
a refractive attenuation rate in echo intensity measurement 1.5%.

Process 201: blowing a fluid through a blowing port onto the material to be inspected.

Process 301: inspecting the material to be inspected, in particular, an inner portion thereof using the ultrasound waves, after the process 201 or at a same time as the process 201.

Here, a supplement will be made with respect to the condition where: the surface temperature of the material to be inspected—the ambient temperature>2° C. in the process 201, that is, a condition where the surface temperature of the material to be inspected exceeds the ambient temperature by more than 2° C. Even if an ambient temperature of the entire location where the inspection is performed, including positions where an ultrasonic probe transmits and receives ultrasound waves, is maintained at a room temperature around 20° C. by an air conditioning unit or the like in the process 201, a space having a temperature higher than the ambient temperature may exist in a substantially layered manner in the vicinity of the surface of the material to be inspected due to heat dissipation from the material to be inspected when the material to be inspected has a high temperature. The effect of the present method is more advantageous when the difference between the temperature of the substantially layered space and the ambient temperature is also 2° C. or more, and thus such a difference is preferable.

Further, there is also disclosed a manufacturing method including at least one of a raw material, an in-process intermediate, or a product in the inspection method. As such a manufacturing method, a molding material manufacturing method including inspecting the molding material as the material to be inspected using the inspection method is exemplified. Hereinafter, unless otherwise noted, the term "present method" refers to both an inspection method and a manufacturing method including performing inspection using the inspection method.

The significance of the present invention is increased when the surface temperature of the material to be inspected is higher than the ambient temperature by 5° C. or more at the time of performing the process 201, and thus such a difference is preferable. It is more preferable when the difference is 8° C. or more, and further more preferable when the difference is 12° C. or more. Although a temperature by which the surface temperature of the material to be inspected is higher than the ambient temperature is not strictly limited, that is, an upper limit of a temperature difference is not strictly limited, the temperature difference may be 150° C. or less as applied in most inspections, and may be 100° C. or less, or 50° C. or less if further limited.

A preferable value of the temperature difference between the surface temperature of the material to be inspected and the ambient temperature is also preferable for a temperature difference between the layered space in the vicinity of the surface of the material to be inspected and the ambient temperature.

In the present method, the process 201 is performed in a state where the surface temperature of the material to be inspected—the ambient temperature>2° C. As an example of this condition, a condition is enumerated where the surface temperature of the material to be inspected—the ambient temperature>2° C. at a time point when blowing of the fluid is started in the process 201, and a different atmosphere layer, whose ultrasound wave propagation behavior is different from those of air at a part of an inspection device which transmits ultrasound waves, air at a part of the inspection device which receives the ultrasound waves or air surrounding both parts.

In the present method, it is preferable that the inspection using ultrasound waves in the process 301 includes propagating the ultrasound waves on the surface of the material to be inspected, which is a portion where the fluid flows in the process 201. Further, it is preferable that, in the process 201, a portion of the surface of the material to be inspected, through which the ultrasound waves emitted to the material to be inspected pass when coming out after penetrating an inner portion of the material to be inspected, is also a portion where the blown fluid flows, occurrence of a phenomenon where a ratio of refraction of the ultrasound waves at a boundary between different atmospheres increases and an echo intensity is significantly reduced (regarding the present invention, may be referred to as attenuation due to refraction of the ultrasound waves or refractive attenuation) can be prevented. In a case where the ultrasonic inspection is performed by arranging at least one pair of ultrasonic probes facing each other with the material to be inspected in between without contacting the material to be inspected, the effect of the method of propagating the ultrasound waves in the ultrasonic inspection of the process 301 through the portions where the fluid flows in the process 201 is remarkable, by blowing the fluid on two surfaces of the material to be inspected which face the ultrasonic probes and propagating the ultrasound waves through the portions where the fluid flows on each surface.

In the present method, it is preferable that the inspection using ultrasound waves in the process 301 includes arranging at least one pair of ultrasonic probes facing each other with the material to be inspected in between without contacting the material to be inspected, transmitting the ultrasound waves from one of the ultrasonic probes, and receiving the transmitted ultrasound waves by the other ultrasonic probe. This is because the inspection can be efficiently performed with high accuracy. A non-contact type ultrasonic inspection method in which the inspection is performed without bringing the ultrasonic probe into contact with the material to be inspected is preferable in the present method since, with such a method, even in a case where the material to be inspected is very soft, the ultrasonic inspection can be performed accurately without such occurrence that the surface of the material to be inspected is deformed due to being pressed by the probe as in contact type ultrasonic inspection. Also in a case of moving the material to be inspected and the probe relatively in the ultrasonic inspection, the non-contact type ultrasonic inspection is preferable since, with such a method, there is no occurrence that the material to be inspected and the probe wear or damage each other as in the contact type ultrasonic inspection.

It is preferable that the ultrasound waves employed in the process 301 of the present method have a frequency of 100 kHz to 1000 kHz, since such ultrasound waves have sufficient directivity, do not exhibit large attenuation when propagating in the atmosphere (in the air in most cases) or in the material to be inspected, and further have sufficient resolution making it possible to detect a defect or the like in the material to be inspected. As the frequency of the ultrasound waves, a frequency of 200 kHz to 800 kHz is more preferable, and a frequency of 400 kHz to 600 kHz is further more preferable.

The fluid blown onto the material to be inspected in the process 201 of the present method can be used without any particular limitation as long as the fluid does not adversely affect the propagation of the ultrasound waves, the material to be inspected, a surrounding environment, the human body and the like, and is preferably at least one selected from a group consisting of air, water vapor, an inert gas, and mist-like water since being easily available. Here, the inert gas is at least one selected from nitrogen, carbon dioxide, helium, neon, argon, krypton, and xenon.

It is preferable that, in the present method, the processes 201 and 301 are performed at the same time and the difference between the surface temperature of the material to be inspected and the ambient temperature at the time of inspection is 5° C. or more, since the material to be inspected that has a high temperature immediately after being manufactured or processed can be quickly inspected without providing a cooling time period, that is, a required time period for the inspection can be shortened.

It is preferable that, the present method uses a material to be inspected in a condition where: a surface temperature thereof—the ambient temperature>2° C., and at least a part of the different atmosphere layer in contact with the surface of the material to be inspected is replaced with the fluid blown on to the material to be inspected in the process 201 to form a fluid atmosphere region, and the inspection using ultrasound waves in the process 301 is performed by propagating the ultrasound waves in the fluid atmosphere region, since attenuation of the ultrasound waves caused by refraction at the boundary between different atmospheres is slight in echo intensity measurement of the ultrasound waves. Here, the different atmosphere layer refers to an atmosphere layer whose ultrasound wave propagation behavior is significantly different from that of the ambient atmosphere. For example, when the material to be inspected is immediately after being manufactured or immediately after being processed and has a temperature higher than the temperature of surroundings (ambient temperature), an atmosphere layer having a higher temperature is formed after an atmosphere in the vicinity of the material to be inspected is heated. Since the atmosphere layer has a low density, it becomes a different atmosphere layer in many cases. Further, for example, it is conceivable that a constituent component such as an additive in the material to be inspected is decomposed to produce a gas, and the gas remains in the vicinity of the material to be inspected to form a different atmosphere layer.

When the inspection for the material to be inspected using the ultrasound waves in the process 301 is performed by propagating the ultrasound waves through the portion where the different atmosphere layer exists on the surface of the material to be inspected, a curved surface portion is generated on a boundary surface between the ambient atmosphere and the different atmosphere layer due to fluctuation. The ultrasound waves are partially refracted at the curved surface portion, and a proportion of a straight traveling component of the propagated ultrasound waves is significantly reduced. As a result, the echo intensity of the ultrasound waves measured in the inspection is equal to or significantly lower than that in a case where the inspection is affected by material of the material to be inspected or by voids or foreign matters in the material to be inspected, that is, it is difficult to obtain an appropriate inspection result of the material to be inspected.

It is preferable that, in the present method, at least a part of the different atmosphere layer is replaced with the fluid in a region within 3 mm from the surface of the material to be inspected to an outside of the material to be inspected to form the fluid atmosphere region, since occurrence that the echo intensity observed is very low due to refraction of the ultrasound waves at the boundary between different atmosphere layers can be efficiently prevented at the time of measuring the echo intensity of the ultrasound waves. The entire different atmosphere layer existing in the region within 3 mm from the surface of the material to be inspected to the outside of the material to be inspected may be replaced with the fluid to form the fluid atmosphere region. In replacing with the fluid at least a part of the different atmosphere layer existing in the region within 3 mm from the surface of the material to be inspected to the outside of the material to be inspected to form the fluid atmosphere region, if there is another different atmosphere layer in a region 3 mm more away from the surface of the material to be inspected to the outside, it is preferable to replace the different atmosphere layer with the fluid together to form a fluid atmosphere region since a more accurate inspection result can be obtained.

It is preferable that, the present method uses the material to be inspected in a condition where: a surface temperature thereof—the ambient temperature>2° C.; and the material to be inspected has the different atmosphere layers contacting one face of the material to be inspected and the other face of the material to be inspected opposite to the one face, the fluid is blown onto the material to be inspected in the process 201, at least a part of each different atmosphere layer is replaced with the fluid to form two or more fluid atmosphere regions, and the inspection using ultrasound waves in the process 301 is performed by propagating the ultrasound waves from one fluid atmosphere region on one face to another fluid atmosphere region on the other face, since the inspection can be more efficiently performed.

It is preferable that, in the present method, the fluid blown onto the material to be inspected in the process 201 has a flow velocity of 1 m/s or more in a direction parallel to the surface of the material to be inspected, and has a Reynolds number of 100,000 or less, since the attenuation of the ultrasound waves due to refraction is less likely to occur. It is considered that this is because the different atmosphere layer is efficiently replaced by the fluid atmosphere region through the fluid blowing under the above conditions. The fluid flow velocity in the direction parallel to the surface of the material to be inspected is preferably 3 m/s or more and more preferably 5 m/s or more under the condition that the Reynolds number is 100,000 or less. An upper limit of the fluid flow velocity is not strictly limited, and is preferably 50 m/s or less and more preferably 20 m/s or less if intentionally provided.

The Reynolds number is more preferably 75,000 or less, further more preferably 50,000 or less, and particularly preferably 20,000 or less. A lower limit of the Reynolds number is not strictly limited, and is preferably 500 or more and more preferably 1,000 or more if intentionally provided.

As the Reynolds number, a value Re calculated using the following formula is enumerated:

$$Re = Uh \times L / v$$

in which Uh (m/s) represents a horizontal component of a characteristic flow velocity of the fluid, L (m) represents a characteristic length that is a linear distance from the fluid blowing port to an end portion of the material to be inspected (end portion in the TD direction of FIG. 3, at a side where the fluid is blown), and v (m$^2$/s) represents a coefficient of Kinematic viscosity of the fluid.

In a case where the fluid is blown in a direction that is not horizontal with respect to the surface of the material to be inspected due to an operating range of a production robot or arrangement of devices and piping, it is preferable that the Reynolds number is calculated by using a component parallel to the surface of the material to be inspected of the characteristic flow velocity of the fluid as the flow velocity, since a flow behavior of the fluid can be grasped more accurately. The above Reynolds number may be referred to as a quasi-Reynolds number since the above Reynolds number can be understood to be different from a general Reynolds number.

Figure 4:
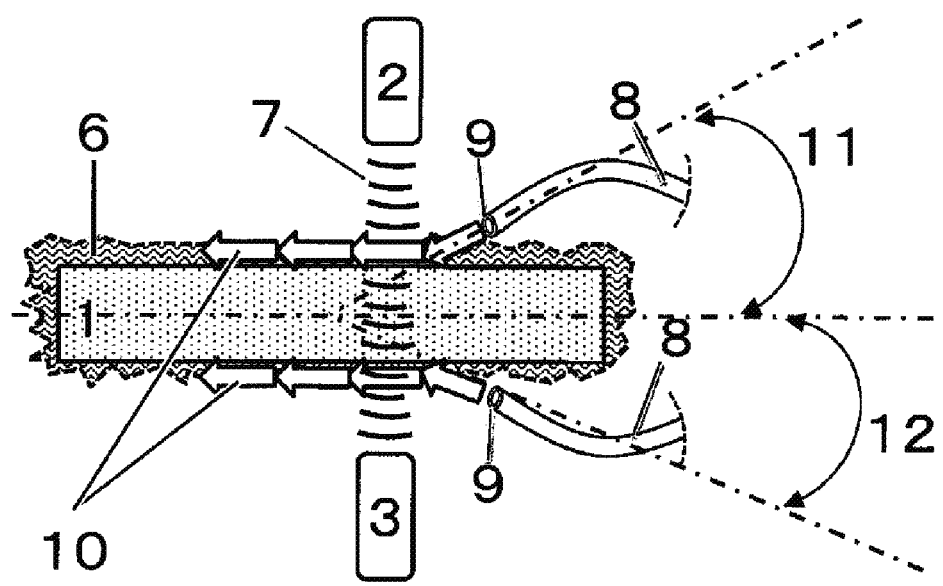
FIG. 4 is a schematic diagram illustrating the material to be inspected based on observation of the material to be inspected from the side surface direction thereof (a direction substantially perpendicular to the thickness direction) as in FIG. 2 in a state where the different atmosphere layer is formed around the rectangular sample having a temperature exceeding the ambient temperature by more than 2° C., but a part of the different atmosphere layer is replaced with a layer of a fluid component by blowing the fluid, and as a result, the refraction of the ultrasound waves is less likely to occur at the boundary between the ambient atmosphere and the different atmosphere layer at the time of inspection.

It is preferable that, in the method, in a case where the fluid is not blown in a direction that is substantially parallel (horizontal in many cases) to the surface of the material to be inspected as described above, an angle of a direction of the fluid blown onto the material to be inspected (hereinafter, may be abbreviated as a blow angle) in the process 201 is preferably within ±45 degrees with reference to the surface of the material to be inspected, since the attenuation of the ultrasound waves due to refraction can be efficiently suppressed at the time of inspection. The angle of blow direction is more preferably within ±40 degrees, and further more preferably within ±35 degrees. Here, the angle of blow direction having a negative value indicates an angle at which the fluid is blown on a lower face side of the material to be inspected as illustrated in FIG. 4. The blow angles on upper and lower face sides of the material to be inspected may have the same magnitude or may have different magnitudes. In addition, when there are a plurality of fluid blowing ports on any one of the upper face side and the lower face side, the same blow angles may be applied to all the fluid blowing ports, or the fluid may be blown at different blow angles. In a case of performing the ultrasonic inspection by blowing the fluid at a predetermined blow angle with respect to the surface of the material to be inspected as described above, the fluid is not directly blown at the blow angle to a portion on the surface of the material to be inspected where ultrasound waves from a transmitting probe is transmitted, or to a portion on the surface of the material to be inspected where the transmitted ultrasound waves come out to the outside toward a receiving probe after passing through the inner portion of the material to be inspected. It is preferable that the fluid blowing is performed such that the fluid is blown to a position slightly away from the portions and flows substantially parallel to the surface of the material to be inspected at the portions, since the attenuation of the ultrasound waves due to refraction is greatly suppressed. Regarding the present invention, "substantially parallel" not only includes a state where two lines, planes, directions, and the like of interest are completely parallel, but also includes a state slightly deviated from being completely parallel as long as the state does not present an obstacle in solving the problem of the present invention. When a numerical range is intentionally defined for this slightly deviated state, a state deviated from a complete parallel state in an angle range of about ±3° is exemplified, and preferably a state deviated from a complete parallel state in an angle range of about ±1° is exemplified.

In the present method, a thickness of the material to be inspected is preferably 0.1 mm or more since such a thickness is particularly suitable for ultrasonic inspection. The thickness of the material to be inspected is more preferably 0.5 mm or more, and further more preferably 1.0 mm or more. An upper limit of the thickness of the material to be inspected is not particularly limited, is preferably 20 mm or less as applied to many materials to be inspected, and is further more preferably 10 mm or less.

In the present method, the material to be inspected is preferably a metal-based material or a resin-based material, and in particular, is preferably at least one selected from a group consisting of magnesium, aluminum, iron, and a fiber-reinforced resin composite materials (examples: a glass fiber reinforced thermosetting resin, a glass fiber reinforced thermoplastic resin, a carbon fiber reinforced thermosetting resin, and a carbon fiber reinforced thermoplastic resin), since it is often the case for applications where a quality determination needs to be performed quickly and efficiently in the ultrasonic inspection. Although a preferable material as the material to be inspected will be described in more detail below, the material to be inspected may include the above material, or may be substantially formed of the above material.

The material to be inspected in the present method is preferably in a substantially plate shape, since it is easy to perform the ultrasonic inspection or fluid blowing. Here, a substantially plate shape refers to a shape of which, when holding a face having the largest area of the material to be inspected (largest face) and a face opposed thereto (which may have the same area as that of the largest surface or area smaller than that of the largest face, and hereinafter is referred to as a quasi-largest face) with one taking as an upper face and the other as a lower face, a thickness dimension of the material to be inspected as viewed from a horizontal direction is smaller than a width dimension and a depth dimension of the material to be inspected as viewed from right above in a vertical direction (thickness direction). A thickness dimension of a part thereof may be larger than the width dimension and the depth dimension. The material to be inspected having a substantially plate shape may have a certain degree of step or inclination in the shape as viewed from the horizontal direction (thickness shape) in the above-described holding state. With respect to the step or inclination in this case, a ratio of a thickness of a thick portion to that of the thinnest portion is greater than 1 and equal to or less than 5, and is more preferably greater than 1 and equal to or less than 3. The material to be inspected having a substantially plate shape may be one having a curved plate shape. With respect to the material to be inspected having a substantially plate shape, one of which the shape as viewed in the thickness direction in the above-described holding state is a rectangular shape is typical, and may be one of which the shape is a polygonal shape, a round shape, or an irregular shape other than the rectangular shape, or may be one having one or more through-holes in the thickness direction. It is more preferable that the material to be inspected in the present method is not only in a substantially plate shape but also in a substantially flat plate shape. It is preferable that the substantially flat plate shape is substantially plate-like as viewed from the horizontal direction in the above-described holding state. That is, it is preferable that there is no obvious step or no change in the thickness of two times or more, since such a shape has many applications and is convenient for inspection. In a case of a flat-plate-shaped material to be inspected having a substantially uniform thickness, the blow angle can also be shown as an angle with respect to a horizontal plane at a center of a plate thickness.

In the present method, in a case where the material to be inspected has a substantially plate shape and has an inclination in a thickness shape, it is preferable that the ultrasonic probe is disposed such that an axis thereof is located to be perpendicular to an inclined surface thereof, since an inspection result with higher accuracy can be obtained; the fluid blowing may be performed at the above-described preferable blow angle with the inclined surface serving as a reference surface. This method is particularly preferable in a case where the material to be inspected has a substantially plate shape and has an inclination in a thickness shape and where parts to be inspected that are substantially parallel surfaces in the thickness direction of the material to be inspected are inspected.

In the present method, in a case where the material to be inspected has a curved plate shape, the inspection may be performed by propagating ultrasound waves to a portion that is approximately regarded as flat-plate shaped. At this time, it is preferable that the ultrasonic probe is disposed such that an axis thereof is located to be perpendicular to a tangent plane of the portion, since an inspection result with higher accuracy can be obtained; the fluid blowing may be performed at the above-described preferable blow angle with the tangent plane serving as a reference plane.

In the present method, it is preferable that, at the location where the inspection is performed using ultrasound waves (inspection location), the material to be inspected is continuously supplied and the inspection is performed in the process 301, since the inspection can be efficiently performed. A method of continuously supplying the material to be inspected to the inspection location is preferably a method using a device such as a belt conveyor, a roller, or a robot hand depending on a shape of the material to be inspected.

In the present method, it is preferable that, in the process 301, the inspection using ultrasound waves is performed while the material to be inspected and the ultrasonic probe are moved, and the fluid blowing port is moved in accordance with movement of the ultrasonic probe, since the fluid can selectively flow at a portion where the ultrasound waves propagate at the surface of the material to be inspected in a state close to layered flow, leading to a higher inspection accuracy, and further an amount of the fluid to be blown can be controlled, that is, a wide range of the material to be inspected can be efficiently inspected. Here, although "the fluid blowing port is also moved in accordance with movement of the ultrasonic probe" means that the ultrasonic probe and the fluid blowing port are moved at the same speed in the same direction, the ultrasonic probe and the fluid blowing port may not move completely at the same speed in the same direction all the time as long as the above-described effect is exhibited. The mode in which the fluid blowing port is also moved in accordance with the movement of the ultrasonic probe according to the present invention may be performed by the process 201 and the process 301 at the same time or may be performed by the process 201 and the process 301 separately.

As a method of moving the fluid blowing port in accordance with the movement of the ultrasonic probe, the fluid blowing port may be directly or indirectly connected to the ultrasonic probe, or a device that moves the fluid blowing port in accordance with the movement of the ultrasonic probe by numerical control or the like may be used without such a connection.

In the present method, in a case where the difference between the surface temperature of the material to be inspected and the ambient temperature is 5° C. or more before the fluid is blown in the process 201, it is preferable that the fluid is blown with respect to the material to be inspected until the difference decreases less than 5° C. and that the ultrasonic inspection of the process 301 is performed while maintaining a state of the difference being less than 5° C., since the attenuation of the ultrasound waves due to refraction can be particularly reduced in the ultrasonic inspection. The above-described temperature difference is more preferably 2° C. or less.

In the present method, it is preferable that the process 301 further includes converting data of the inspection using ultrasound waves into an image and determining a pass or fail based on the image, since the pass or fail determination can be quickly performed. Here, a method of converting data into image is not particularly limited. In many cases, when purchasing an ultrasonic inspection device, imaging software is also provided along with a data processing computer terminal.

In the present method, it is preferable that the processes 201 and 301 are performed at the same time, and that a direction of the fluid blown onto the material to be inspected in the process 201 is different from a direction of the ultrasound waves propagated at a time of inspecting the material to be inspected, in particular, the inner portion thereof using the ultrasound waves in the process 301, since the inspection can be efficiently performed and the attenuation of the ultrasound waves due to refraction is reduced in the ultrasonic inspection. Further, it is preferable that the direction of the fluid blown onto the material to be inspected flows on the surface of the material to be inspected is substantially perpendicular to the direction of the ultrasound waves propagated, since the ultrasonic inspection can be performed with higher accuracy. In the present invention, "substantially perpendicular" not only includes a state of being completely perpendicular, that is, a state where two lines, planes, directions, or the like of interest are completely perpendicular, but also includes a state slightly deviated from being completely perpendicular as long as the state does not present an obstacle in solving the problem of the present invention. When a numerical range is intentionally defined for this slightly deviated state, a state deviated from a complete perpendicular state in an angle range of about ±3° is exemplified, and preferably a state deviated from a complete perpendicular state in an angle range of about ±1° is exemplified.

The product manufacturing method including inspecting a raw material, an in-process intermediate, or a product as a material to be inspected in the inspection method disclosed herein is preferable since the efficiency and accuracy of the ultrasonic inspection are excellent, that is, a high-quality product is provided at a higher productivity. In particular, the material to be inspected is a molding material, and a molding material manufacturing method including inspecting the molding material with the above-described inspection method, in other words, a molded body manufacturing method including molding the molding material after inspection with the above-described inspection method is preferable as a molding material or molded body manufacturing method since the efficiency and accuracy of the ultrasonic inspection are excellent. The molding material is preferably at least one selected from a group consisting of magnesium, aluminum, iron, a glass fiber reinforced thermosetting resin, a glass fiber reinforced thermoplastic resin, a carbon fiber reinforced thermosetting resin, and a carbon fiber reinforced thermoplastic resin.

<Process 201>

In the present method, the process 201 is a process of blowing a fluid through a blowing port onto a material to be inspected, and may be referred to as a fluid blowing process.

Figure 6A:
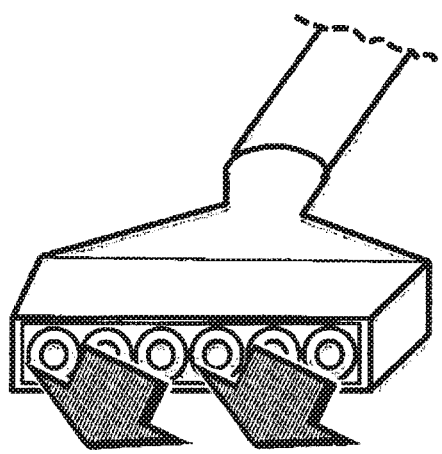
FIG. 6A illustrates an example of a shape of the thin wide-mouth nozzle that is attached to the fluid blowing port and that makes it possible to efficiently blowing the fluid onto a surface of the material to be inspected. Arrows in the drawing indicate blowing-out of the fluid.
Figure 6B:
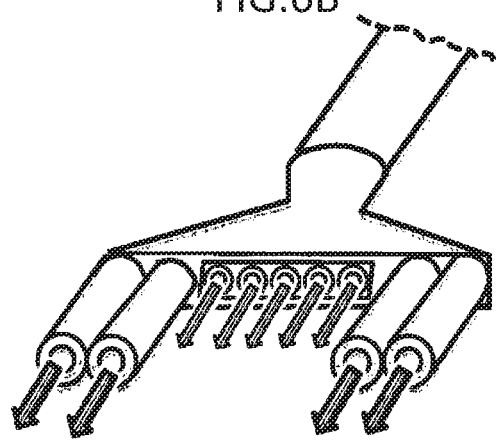
FIG. 6B illustrates an example of the shape of the nozzle that is attached to the fluid blowing port.
Figure 6C:
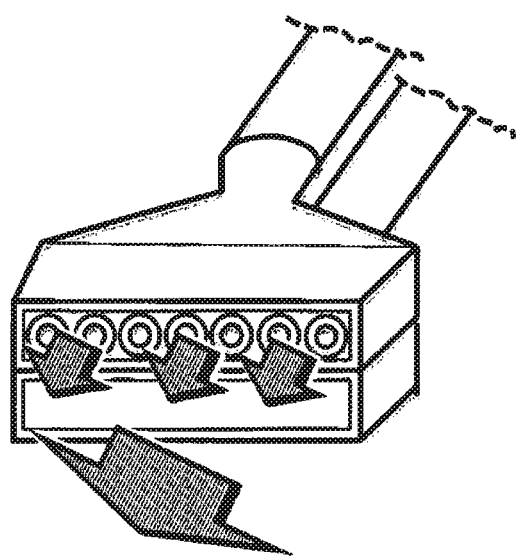
FIG. 6C illustrates an example of the shape of the nozzle that is attached to the fluid blowing port.
Figure 6D:
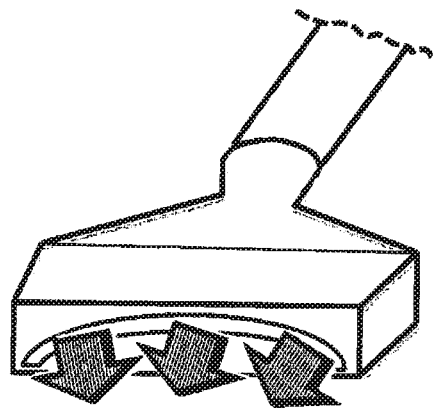
FIG. 6D illustrates an example of the shape of the nozzle that is attached to the fluid blowing port.
Figure 6E:
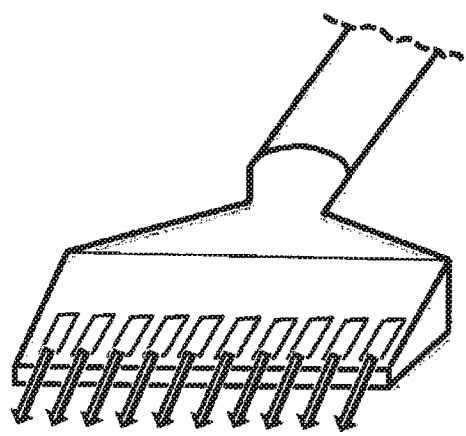
FIG. 6E illustrates an example of the shape of the nozzle that is attached to the fluid blowing port.
Figure 6F:
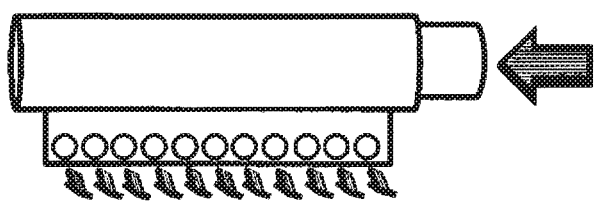
FIG. 6F illustrates an example of the shape of the nozzle that is attached to the fluid blowing port.
Figure 6G:
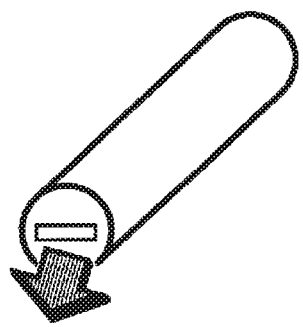
FIG. 6G illustrates an example of the shape of the nozzle that is attached to the fluid blowing port.

An equipment that blows the fluid is exemplified which includes a fluid supply or generation device, a fluid conduit, and a device that controls flow of the fluid, in addition to the fluid blowing port. In the equipment that blows the fluid, it is preferable that a part including the fluid blowing port is a structure that can change a position or an orientation of the part including the fluid blowing port can be changed, since it is easy to adjust the blow angle so as to blow the fluid at the predetermined angle with respect to the surface of the material as described above. Further, the fluid blowing port may be of a movable type so that the fluid blowing can be performed in accordance with the movement of the material to be inspected or the movement of the ultrasonic probe, and the fluid blowing port may be coupled to the ultrasonic probe to form a structure in which one is moved in accordance with movement of the other. The fluid blowing port may be an outlet end of the fluid conduit, or may be attached to a nozzle. Although nozzles in various shapes and materials can be appropriately used as the nozzle, it is preferable that the nozzle is a so-called swivel nozzle since a swivel nozzle can efficiently blow the fluid. Examples of shapes of nozzles are illustrated in FIGS. 6A to 6G. It is preferable to use a nozzle having a flat shape as illustrated in FIG. 6A and capable of blowing the fluid in a wide state, since the nozzle can blow the fluid efficiently in a wider range with respect to a flow rate of the fluid. The nozzles illustrated in FIGS. 6B and 6C can also be used. The nozzle illustrated in FIG. 6D has an arcuate fluid blowing port, and is suitable, for example, in a case where it is desired to blow the fluid uniformly as much as possible to a convex curved portion of a surface of the material to be inspected having a curved plate shape. The nozzles illustrated in FIGS. 6E, 6F, and 6G can also be used.

The fluid supply or generation device used for the fluid blowing of the present method is not particularly limited, and can be appropriately selected and used in accordance with the fluid. When the fluid is a gas, the gas may be supplied from a gas tank or a gas cylinder via a conduit, and a gas of a target component which is separated by a gas-liquid separating device or a gas separating device can also be used. When the fluid is air, an air flow generated by a blower, a compressor, and a large cool air device can be more easily used for the fluid blowing such as by sending the air flow into the conduit.

When the fluid is a liquid, the liquid may be sent from a tank or the like by a pump or the like to be blown through the fluid blowing port onto the material to be inspected, the liquid may be used for blowing after being made into mist, and the liquid may be made into mist and used for blowing after being mixed with a gas fluid. The fluid used for blowing may be one kind or a plurality of kinds, and may be a mixture of gas and liquid.

Preferable fluids used in the present method are as described above, but the fluids are not limited thereto, and a preferable fluid can be appropriately used depending on characteristics of the material to be inspected and conditions of the inspection.

In the present method, the process 201 may be performed before the process 301 relating to the ultrasonic inspection, or may be performed at the same time as the process 301.

<Process 301>

In the present method, the process 301 is a process of inspecting a material to be inspected, in particular, an inner portion thereof using ultrasound waves after the process 201 or at the same time as the process 201.

In general, ultrasound waves refer to high frequency sound waves having a frequency exceeding 20 kHz (20,000 Hz) that is an upper limit of a frequency range of sound which a human can hear. However, sound waves at a frequency exceeding 16 kHz (16,000 Hz) can be used for the inspection as ultrasound waves, and in the present method as well, sound waves of 20 kHz or less is used as the ultrasound waves as long as a target inspection can be performed. Preferable frequencies of the ultrasound waves used in the present method are as described above.

The ultrasound waves have a property of easily propagating in an order of gas<liquid<solid, having high straight traveling performance, and being reflected at a boundary surface between different substances when propagating. Therefore, when propagating in an object, if an inner portion of the object is in a completely uniform state, the ultrasound waves are reflected similarly at a surface on an opposite side of a surface where the ultrasound waves propagate to the object. When there are spaces, different structural states, or foreign parts such as different substances at the inner portion of the object, the ultrasound waves are reflected at the boundary surface, that is, a singular point occurs in a reflection and transmission behavior of the ultrasound waves in the object. In the present method using this principle, it is possible to confirm occurrence of voids or peeling, and extents of foreign matter contamination, unintended uneven distribution of constituent components, or the like in the material to be inspected with the inspection using ultrasound waves, and it is possible to efficiently and highly accurately determine whether the material to be inspected may be used in a next process as a material or an in-process intermediate, or may be shipped and sold as a product.

Here, the ultrasound waves used for the inspection may be pulse waves or a continuous waves, or both may be used.

In terms of classification of transmission and reception method for the ultrasound waves, the inspection using ultrasound waves in the process 301 may use a reflection type method in which transmission of ultrasound waves and reception of the ultrasound waves that are transmitted to propagate in the material to be inspected are both performed with one ultrasonic probe, or may use any of a reflection type method and a transmission type method in which transmission and reception of the ultrasound waves are performed by separate probes, respectively. Therefore, an echo intensity relating to the present method may be a transmitted echo intensity or a reflected echo intensity depending on the transmission and reception method for the ultrasound waves that is used.

The inspection using ultrasound waves performed in the present method may be any one of a contact method in which a probe is brought into contact with a material to be inspected to propagate ultrasound waves, an immersion method in which ultrasound waves are propagated after immersing a part to be inspected of a material to be inspected in a liquid that is a contact substance (in many cases, water is used), and a non-contact air method in which a probe is disposed away from a material to be inspected and ultrasound waves are propagated to the material to be inspected via a layer of an atmosphere (mainly air) without using a contact substance. Among these, the ultrasonic inspection method is preferably the non-contact air method since, with this method, the inspection can be performed efficiently even when the material to be inspected is in a high temperature state and there is no need for a device or a process of removing the contact substance. Needless to say, two or more of the contact methods, the immersion method, and the non-contact air method may be used in combination, and an ultrasonic inspection method that does not correspond to these methods may also be applied to the present method.

The ultrasonic probe used in the ultrasonic inspection of the process 301 is not particularly limited, generally may have a transmitting function of generating and transmitting ultrasound waves by vibrating a piezoelectric element, and a receiving function of receiving ultrasound waves propagated in the material to be inspected. One ultrasonic probe may have both the transmitting function and the receiving function. A transmitting probe and a receiving probe may be separately provided. When a separate transmitting probe and a separate receiving probe, that is, a pair of ultrasonic probes is used to perform the ultrasonic inspection, the pair of ultrasonic probes may be opposed to each other with the material to be inspected in between, and the pair of ultrasonic probes may be arranged with the surface of the material to be inspected with a V shape of ultrasound waves being transmitted obliquely from one probe with respect to the surface of the material to be inspected and reflected from the material to be inspected being received by the other probe. In the ultrasonic inspection, a plurality of pairs of ultrasonic probes may be used, in which case each pair of ultrasonic probes may be in the same arrangement described above or may be at different positions.

In the process 301, in a case of inspecting a material to be inspected that is moving, an equipment is used that is capable of reciprocating the ultrasonic probe in a width direction (TD direction) of the material to be inspected and in a moving direction (MD direction) of the material to be inspected, so that it is also possible to move the ultrasonic probe in a certain section in a same direction or an opposite direction of the MD direction of the material to be inspected to perform the inspection, and if the fluid blowing of the process 201 is performed at the same time as the process 301, the fluid blowing port can also be moved in accordance with the ultrasonic probe.

The present method of moving the probe in accordance with the movement of the material to be inspected has very high efficiency and accuracy of inspection, and is suitable for inspection or manufacturing of a material to be inspected, for example, a raw material to be continuously accepted in a process, a process intermediate for which a pass or fail determination is required in a process continuously, or a product to be continuously produced and shipped.

In the process 301, it is preferable that the ultrasonic inspection device has an mechanism that detects a foreign part in the material to be inspected by receiving ultrasound waves propagated to the material to be inspected with a probe having a receiving function, converting the received ultrasound waves into an electric signal using a piezoelectric element, and at this time, analyzing a waveform of the ultrasound waves, particularly, a waveform peak for each pulse of continuously irradiated pulses, since with such an ultrasonic inspection device, a highly accurate inspection result can be obtained.

In the process 301, it is preferable that the electric signal converted from the received ultrasound waves as described above is converted into a graph or an image after necessary processing is performed in accordance with target information if there is necessary processing, since it is easy to understand the inspection result. Examples of the graph or image conversion include a so-called A-scope obtained by displaying a waveform on a rectangular coordinate system in which an received echo intensity by the ultrasonic probe is set as a vertical axis and a propagation time of the ultrasound waves (that is, a distance) as a horizontal axis, a B-scope (tomographic image of the material to be inspected) obtained by brightness-modulating a waveform of the A-scope, expressing as a line, and displaying a location (one-dimensional) of the probe on the material to be inspected and time on the rectangular coordinate system, and a C-scope obtained by brightness-modulating an received echo intensity at a certain depth of the ultrasonic probe and displaying the location (two-dimensional) on the material to be inspected as a rectangular coordinate system. In the image obtained as described above, since difference in ultrasound wave propagation behavior is indicated by difference in color or shade, the presence of voids, foreign matters and the like in the material to be inspected can be easily grasped, and a quality determination can be quickly performed.

Figure 7A:
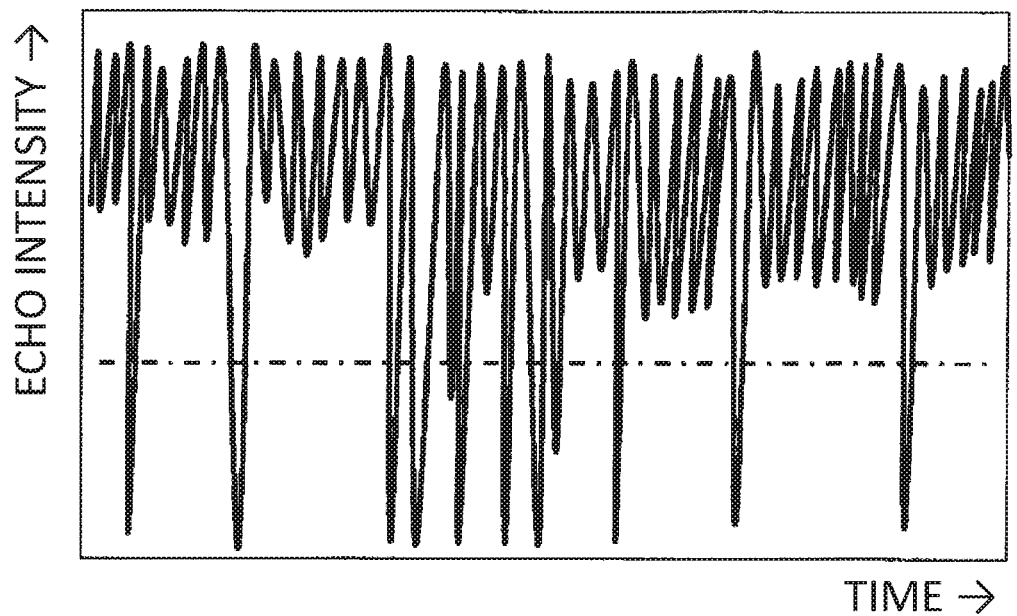
FIG. 7A is a schematic diagram illustrating an outlined waveform in a case where the ultrasonic waves are greatly attenuated due to the refraction at the boundary between the different atmosphere layer formed on the surface of the material to be inspected and the ambient atmosphere in echo intensity measurement in the ultrasonic inspection.
Figure 7B:
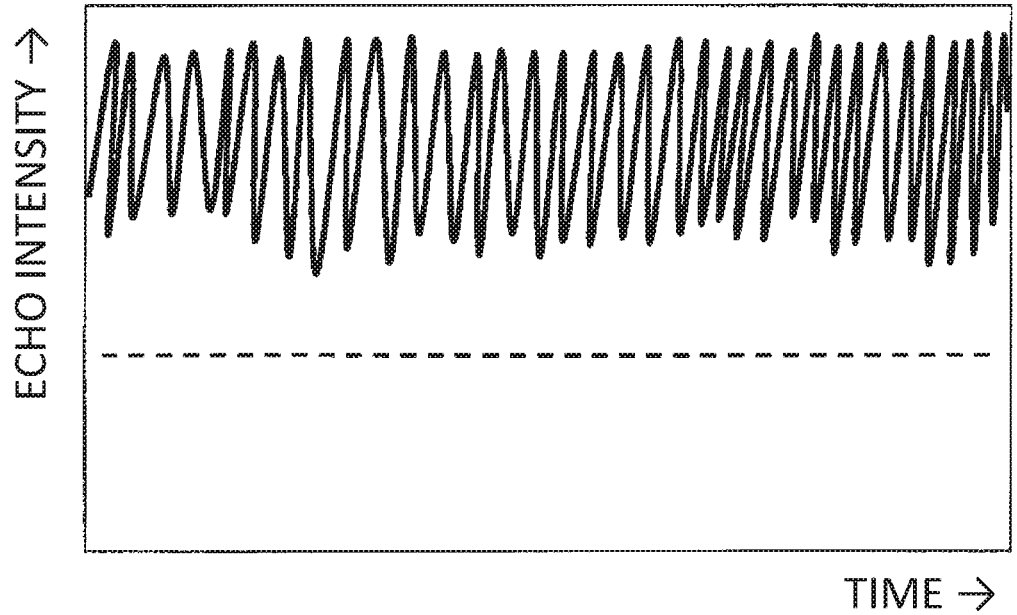
FIG. 7B is a schematic diagram illustrating an outlined waveform in a case where the attenuation due to the refraction of the ultrasound waves at the boundary between the different atmosphere layer formed at the surface of the material to be inspected and the ambient atmosphere is extremely low in the echo intensity measurement in the ultrasonic inspection.

Both noise and an attenuation degree of the ultrasound waves due to refraction at the boundary between different ambient atmospheres in the echo intensity measurement in the ultrasonic inspection affect the A-scope. FIGS. 7A and 7B are schematic diagrams illustrating continuously plotted peaks of the waveforms of the A-scope in a highly outlined manner. When the attenuation of the ultrasound waves is frequent due to refraction as in a comparative example to be described below, there are parts that are very deep and have apparently different levels at a valley portion of waveform plot of the echo intensity, as is apparent from FIG. 7A. As a result, it is difficult to determine presence or absence of a valley portion caused by voids or foreign matters in the material to be inspected, and thus reliability of an obtained inspection result may be low. In the present method, by performing the ultrasonic inspection while blowing the fluid to the material to be inspected, for example, even when the material to be inspected is in a high temperature state immediately after manufacturing or processing, it is possible to perform the echo intensity measurement with attenuation of the ultrasound waves due to refraction at the atmosphere layer boundary being little as illustrated in FIG. 7B, that is, the inspection can be performed quickly and with high accuracy without waiting for a decrease in the temperature of the material to be inspected.

As an indicator obtained by quantifying a degree of refractive attenuation in the echo intensity measurement of the ultrasonic inspection, a refractive attenuation rate calculated based on the waveform peak of the A-scope is exemplified. As the refractive attenuation rate, a numerical value can be used that is obtained by plotting 5-point moving maximum values of the waveform peak (that is, received echo intensity) in the A-scope to obtain a waveform diagram as illustrated in FIG. 7A or FIG. 7B, and calculating in percentage a proportion of time at which a remarkable decrease in the echo intensity that probably occurred due to refraction of the ultrasound wave is observed per unit time.

In the inspection method of the present invention, it is essential that the inspection using ultrasound waves in the process 301 satisfies: the refractive attenuation rate in the echo intensity measurement 1.5%. When the refractive attenuation rate is 1.5% or less, a decrease in the echo intensity at the time of inspection is sufficiently suppressed, and a reliable inspection result can be obtained. Regarding an upper limit of the refractive attenuation rate, 0.5% or less is preferable, since a highly reliable inspection result can be obtained, and 0.05% or less is more preferable. A lower limit of a preferable range for the refractive attenuation rate in the echo intensity measurement is theoretically 0%, but from the viewpoint that extremely strict environmental maintenance is not required for the echo intensity measurement, 0.00001% or more is preferable, 0.0001% or more is more preferable, and 0.001% or more is further more preferable. A preferable range of the refractive attenuation rate in the echo intensity measurement may be an appropriate combination of numerical values of the above-described upper limits and numerical values of the above-described lower limits depending on applications or conditions. As examples, the refractive attenuation rate is preferably 0.00001% or more and 1.5% or less, more preferably 0.0001% or more and 0.5% or less, and further more preferably 0.001% or more and 0.05% or less <Material to be Inspected>

The material to be inspected relating to the present method is not particularly limited as long as being a material that can be inspected using ultrasound waves, and various materials and shapes can be used.

The present method can efficiently and accurately perform ultrasonic inspection of the material to be inspected in a high temperature state, and thus is suitable for inspection of a metal molded product obtained by casting molten metal directly into a mold, a metal plate workpiece having a high temperature due to shearing or friction at the time of press processing, a thermosetting resin molded product immediately after being obtained by heating and curing a monomer raw material mixture, a thermoplastic resin composition immediately after being obtained by melting and mixing a matrix thermoplastic resin and an additive, a thermoplastic resin composite material obtained by combining a heated and softened thermoplastic resin with another material, a thermoplastic resin-based molded product immediately after molding, and the like. That is, the present method is suitable for inspecting a metal-based material or a resin-based material, and for manufacturing a metal-based product or a resin-based product including the inspection. Examples of the material to be inspected in the present method include a metal-based material such as magnesium, aluminum, or iron, a resin-based material, a ceramic-based material (an inorganic material other than metal, including glass and a carbon material), and a fiber-reinforced material, and the material to be inspected is preferably at least one selected from a group consisting of these materials. Examples of the fiber-reinforced material include: a matrix formed of a resin-based material, a metal-based material, or a ceramic-based material; a reinforcing fiber. Particularly, a composite material that is a fiber-reinforced resin formed of a resin-based material and a reinforcing fiber (example: glass fiber reinforced thermosetting resin, glass fiber reinforced thermoplastic resin, carbon fiber reinforced thermosetting resin, or carbon fiber reinforced thermoplastic resin) is preferable.

Here, magnesium is not limited to pure magnesium, and a magnesium alloy in which magnesium is a main component may be used, and particularly, a magnesium alloy that is highly fire-resistant may be used, such as a magnesium alloy containing zinc and yttrium, and a magnesium alloy containing aluminum and calcium, preferably also lithium.

Here, aluminum is not limited to pure aluminum, and an aluminum alloy that contains a metal other than aluminum and takes aluminum as a main component may be used. More specifically, using international alloy numbers based on the designation numbers of the American Aluminum Association, one or more kinds of aluminum selected from a group consisting of 1000 series aluminum (pure aluminum), 2000 series aluminum (Al—Cu based alloy such as duralumin), 3000 series aluminum (Al—Mn based alloys), 4000 series aluminum (Al—Si based alloys), 5000 series aluminum (Al—Mg based alloys), 6000 series aluminum (Al—Mg—Si based alloys), 7000 series aluminum (Al—Zn—Mg based alloys), 8000 series aluminum (Al-based alloys other than the above) are suitable for the material to be inspected according to the present invention. In Japan, the kind of aluminum is specified by "A1000 series" in which "A" is attached to the above international alloy numbers, and the like.

Here, iron is not limited to pure iron, and an iron alloy that contains a metal other than iron and takes iron as a main component may be used, for example, carbon steel such as mild steel, or stainless steel. Here, examples of the stainless steel include an austenitic stainless steel (examples: SUS304, SUS304L and SUS316), a two-phase stainless steel (example: SUS329J1), a ferritic stainless steel (examples: SUS405, SUS430 and SUS444), a martensitic stainless steel (example: SUS410), and a precipitation hardening stainless steel (example: SUS630).

Here, examples of the resin-based material include a thermosetting resin and a thermoplastic resin, which are exemplified below, and those in which these resins are matrix in a composite material and which further contain various additives.

(Thermosetting Resin)

Examples of the thermosetting resin contained in the material to be inspected used in the present method include cured products of epoxy resin, vinyl ester resin, unsaturated polyester resin, diallyl phthalate resin, phenol resin, maleimide resin, cyanate resin, benzoxazine resin, dicyclopentadiene resin and the like, and it is particularly preferable to use an epoxy resin having excellent adhesiveness and mechanical properties. The epoxy resin is not particularly limited as long as an epoxy group is in a molecule thereof, and is, for example, bisphenol A type epoxy resin, bisphenol F type epoxy resin, phenol novolak type epoxy resin, cresol novolak type epoxy resin, bisphenol AD type epoxy resin, biphenyl type epoxy resin, naphthalene type epoxy resin, alicyclic epoxy resin, glycidyl ester-based resin, glycidyl amine-based resin, heterocyclic epoxy resin, diarylsulfone type epoxy resin, hydroquinone type epoxy resin, or modified products of the above, and these may be used alone or in combination of two or more thereof. The thermosetting resin is preferable because of high rigidity and strength.

(Thermoplastic Resin)

As the thermoplastic resin contained in the material to be inspected used in the present method, generally those having a softening point in a range of 180° C. to 350° C. are used, but the present invention is not limited thereto. Examples thereof include polyolefin resin, polystyrene resin, thermoplastic polyamide resin, polyester resin, polyacetal resin (polyoxymethylene resin), polycarbonate resin, (meth) acrylic resin, polyarylate resin, polyphenylene ether resin, polyimide resin, polyether nitrile resin, phenoxy resin, polyphenylene sulfide resin, polysulfone resin, polyketone resin, polyether ketone resin, thermoplastic urethane resin, fluorine-based resin, and thermoplastic polybenzimidazole resin.

Examples of the polyolefin resin include a polyethylene resin, a polypropylene resin, a polybutadiene resin, a polymethylpentene resin, a vinyl chloride resin, a vinylidene chloride resin, a vinyl acetate resin, and a polyvinyl alcohol resin.

Examples of the polystyrene resin include a polystyrene resin, a syndiotactic polystyrene resin, an acrylonitrile-styrene resin (AS resin), and an acrylonitrile-butadiene-styrene (ABS resin).

As the polyamide resin, at least one selected from a group consisting of PA6 (also called polycaproamide, polycaprolactam, poly-ε-caprolactam), PA26 (polyethylene adipamide), PA46 (polytetramethylene adipamide), PA66 (polyhexamethylene adipamide), PA69 (polyhexamethylene azepamide), PA610 (polyhexamethylene sebacamide), PA611 (polyhexamethylene undecamide), PA612 (polyhexamethylene dodecanamide), PA11 (polyundecane amide), PA12 (polydodecane amide), PA1212 (polydodecamethylene dodecamide), PA6T (polyhexamethylene terephthalamide), PA6I (polyhexamethylene isophthalamide), PA912 (polynonamethylene dodecamide), PA1012 (polydecamethylene dodecamide), PA9T (polynonamethylene terephthalamide), PA9I (polynonamethylene isophthalamide), PA10T (polydecamethylene terephthalamide), PA10I (polydecamethylene isophthalamide), PA11T (polyundecamethylene terephthalamide), PA11I (polyundecamethylene terephthalamide), PA12T (polydodecamethylene terephthalamide), PA12I (polydodecamethylene isophthalamide), and polyamide MXD6 (polymetaxylylene adipamide) is preferred.

Examples of the polyester resin include a polyethylene terephthalate resin, a polyethylene naphthalate resin, a polybutylene terephthalate resin, a polytrimethylene terephthalate resin, and a liquid crystal polyester.

Examples of the (meth)acrylic resin include polymethyl methacrylate. Examples of the modified polyphenylene ether resin include modified polyphenylene ether. Examples of the thermoplastic polyimide-based resin include thermoplastic polyimide, a polyamide-imide resin, and a polyetherimide resin. Examples of the polysulfone resin include a modified polysulfone resin and a polyether sulfone resin. Examples of the polyetherketone resin include a polyetherketone resin, a polyether ether ketone resin, and a polyetherketoneketone resin. Examples of the fluorine-based resin include polytetrafluoroethylene.

The thermoplastic resin used in the present invention may be only one kind or two or more kinds. A mode in which two or more kinds of thermoplastic resins are used in combination may be, for example, one in which thermoplastic resins having different softening points or melting points from each other are used in combination, or one in which thermoplastic resins having different average molecular weights are used in combination, but is not limited thereto.

(Reinforcing Fiber)

The reinforcing fiber that may be contained in the material to be inspected used in the present method is not particularly limited, and may be either an inorganic fiber or an organic fiber.

Examples of the inorganic fiber include carbon fiber, activated carbon fiber, graphite fiber, glass fiber, tungsten carbide fiber, silicon carbide fiber (silicon carbide fiber), ceramics fiber, alumina fiber, natural mineral fiber (basalt fiber or the like), and boron fiber, boron nitride fiber, boron carbide fiber, and metal fiber.

Examples of the metal fiber include an aluminum fiber, a copper fiber, a brass fiber, a stainless steel fiber, and a steel fiber. Examples of the glass fiber include those made of E-glass, C-glass, S-glass, D-glass, T-glass, a quartz glass fiber, a borosilicate glass fiber, and the like. Examples of the organic fiber include fibers made of aramid, PBO (poly-p-phenylenebenzoxazole), polyphenylene sulfide, polyester, acrylic, polyamide, polyolefin, polyvinyl alcohol, polyarylate, and the like. Among the reinforcing fibers, carbon fibers are particularly important, and therefore will be described in more detail below.

(Carbon Fiber)

The carbon fiber which may be contained in the material to be inspected used in the present method is not particularly limited, and those having high strength and a high elastic modulus can be used, of which one kind or two or more kinds in combination may be used. Generally, a polyacrylonitrile (PAN)-based carbon fiber, a petroleum pitch-based carbon fiber, a coal pitch-based carbon fiber, a rayon-based carbon fiber, a cellulose-based carbon fiber, a lignin-based carbon fiber, a phenol-based carbon fiber, a vapor grown carbon fiber, and the like are known, and the material to be inspected may contain any of these carbon fibers. Among these, carbon fibers such as the PAN-based carbon fiber, the petroleum pitch-based carbon fiber, the coal pitch-based carbon fiber, and the rayon-based carbon fiber are preferred.

Among these, the polyacrylonitrile (PAN)-based carbon fiber is preferably used as the carbon fiber, which is contained in the material to be inspected used in the present method, because of excellent tensile strength. When the PAN-based carbon fiber is used as the carbon fiber, a tensile modulus thereof is preferably in a range of 100 GPa to 600 GPa, more preferably in a range of 200 GPa to 500 GPa, and further more preferably in a range of 230 GPa to 450 GPa. The tensile strength is preferably in a range of 2,000 MPa to 10,000 MPa, and more preferably in a range of 3,000 MPa to 8,000 MPa.

A form of the carbon fiber that is contained as a reinforcing fiber in the material to be inspected used in the present method is not particularly limited, and may be a continuous fiber or a discontinuous fiber.

Examples of the continuous fiber include a woven fabric, a knitted fabric, a non-woven fabric, a mat, a knit, a braid, and one obtained by arranging a plurality of carbon fiber yarns in one direction. A so-called UD sheet in which continuous fibers are arranged in one direction and formed into a sheet shape may be used. That is, the carbon fiber that is contained in the material to be inspected used in the present method may be one or more UD sheets. These may be used in combination of two or more kinds. In the case of being arranged in one direction, the fibers can be laminated in multiple layers by changing a direction of the layers, for example, alternately. Laminated surfaces are preferably arranged symmetrically in a thickness direction. In manufacturing a unidirectional material, a general method can be used.

For example, in a case where the material to be inspected is a carbon fiber reinforced thermoplastic resin, a unidirectional plastic tape may be prepared with a method described in JP-A-2013-104056 (Japanese Patent Application Publication), and thereafter laminated to form a molded body. Now, in the case of the UD sheet, a molded body which is obtained by laminating the UD sheet in multiple layers (for example, alternately laminated in orthogonal directions) so that fiber arrangement directions of the layers intersect with each other can be used.

Examples of the material to be inspected that is a fiber reinforced material and contains a discontinuous fiber as the reinforcing fiber include a material obtained by orienting the carbon fibers in a specific direction in a matrix, and a material obtained by randomly dispersing the carbon fibers in an in-plane direction in a matrix. The carbon fiber contained in the material to be inspected used in the present method may be a discontinuous fiber and may be randomly oriented in the in-plane direction. Here, being randomly oriented in the in-plane direction refers to a state where the carbon fibers are not oriented in a specific direction such as one direction but randomly oriented in the in-plane direction of the material to be inspected, and are arranged in a sheet surface without exhibiting a specific directionality as a whole. When the carbon fibers are randomly oriented in the in-plane direction, it is preferable that the material to be inspected substantially has isotropy not anisotropy in the in-plane direction. In this case, in preparing the material to be inspected, a material such as a carbon fiber may be subjected to wet papermaking to be formed in a sheet shape, or discontinuous carbon fibers are dispersed and overlapped to be formed in a sheet shape or a mat shape (hereinafter, sometimes referred to as a mat).

The carbon fiber contained in the material to be inspected used in the present method is preferably a discontinuous carbon fiber because of excellent balance in mechanical properties, surface properties of end surfaces, and moldability in a molding mold.

The carbon fibers contained in the material to be inspected used in the present method may include both those oriented in one direction and those randomly oriented in the in-plane direction. That is, those in which the continuous fibers are oriented in one direction to be formed in a sheet shape, and those in which the discontinuous fibers are randomly oriented in the in-plane direction may be used in combination (for example, laminated), and a material containing both in a matrix may be used as the material to be inspected in the present method.

With respect to a fiber length of the discontinuous carbon fiber contained in the material to be inspected used in the present method, an average fiber length is preferably in a range of 1 mm or more, more preferably in a range of 1 mm to 100 mm, further more preferably in a range of 3 mm to 100 mm, still more preferably in a range of 10 mm to 100 mm, particularly preferably in a range of 10 mm to 50 mm, and most preferably in a range of 12 mm to 50 mm. When the material to be inspected used in the present method contains carbon fibers as reinforcing fibers, the carbon fibers having the average fiber length within the above ranges are preferably randomly oriented (two-dimensionally randomly oriented) in the in-plane direction of the material to be inspected in the matrix.

The carbon fibers contained in the material to be inspected used in the present method may be a mixture of carbon fibers having different fiber lengths. In other words, the carbon fibers contained in the material to be inspected may have a single peak in distribution of the fiber length, or may have a plurality of peaks.

The average fiber length of the carbon fibers contained in the material to be inspected used in the present method may be measured at a number average fiber length, or may be measured at a weight average fiber length. It is preferable that the average fiber length is measured at a weight average fiber length since long fiber lengths are emphasized in calculation thereof. When the fiber length of each carbon fiber is set as Li and a measured number is set as j, the number average fiber length (Ln) and the weight average fiber length (Lw) are obtained by the following formulas (1-1) and (1-2).

$$Ln = \Sigma Li/j \tag{1-1}$$

$$Lw = (\Sigma Li^2)/(\Sigma Li) \tag{1-2}$$

In a case, as will be described, where the reinforcing fibers contained in the material to be inspected has the continuous fibers therein cut by a rotary cutter and a fiber length of the reinforcing fibers is a fixed length, a number average fiber length thereof and a weight average fiber length thereof have the same value. When a carbon fiber reinforced resin that is an in-plane isotropic base material is obtained with a method described below using the carbon fibers cut as described above, an average fiber length of the carbon fibers in the in-plane isotropic base material is substantially equal to an average fiber length at the time of cutting.

The carbon fibers can be extracted from the material to be inspected that is a carbon fiber reinforced resin, for example, by heating the material to be inspected at 500° C. for an hour and removing the resin in a furnace.

Generally, an average fiber diameter of the carbon fiber is preferably in a range of 3 μm to 50 μm, more preferably in a range of 4 μm to 20 μm, further more preferably in a range of 4 μm to 12 μm, still more preferably in a range of 4.5 μm to 12 μm, particularly preferably in a range of 4.5 μm to 10 μm, and most preferably in a range of 4.5 μm to 8 μm. A preferable range of the average fiber diameter of the carbon fiber may be a combination of a lower limit of any range described above and an upper limit of another range, for example, 4.5 μm to 20 μm.

Here, the average fiber diameter described above indicates a diameter of a single yarn of the carbon fiber. Therefore, when the carbon fiber is in a form of a fiber bundle, a diameter of the carbon fiber (single yarn) constituting the fiber bundle is indicated instead of a diameter of the fiber bundle.

The average fiber diameter of the carbon fiber can be measured, for example, with a method described in JIS R7607: 2000.

The carbon fiber contained in the material to be inspected used in the present method may be only a single yarn, only a fiber bundle, or a mixture of both. When fiber bundles of the carbon fiber are used, the number of single yarns constituting each fiber bundle may be substantially uniform or different.

Generally, a carbon fiber that is manufactured and sold is in a bundle, in which about 1,000 to 100,000 single yarns (filaments) of continuous fibers are oriented in substantially the same direction, and strictly should be referred to as a carbon fiber bundle. When such a carbon fiber bundle in a form of a collection of 1,000 to 100,000 filaments is used as a composite material, an entangled portion of the fiber bundle is locally thickened, which may make it difficult to obtain a thin object. Therefore, in a case where the carbon fiber bundle is used as a reinforcing fiber of a composite material, it is preferred to widen or open a commercially available carbon fiber bundle to obtain and use a thinner carbon fiber bundle or a carbon fiber bundle having a smaller number of filaments.

The composite material containing carbon fibers, especially the carbon fiber reinforced resin, is lightweight, has excellent physical properties, and is preferable for various applications. But high cost due to using carbon fibers hinders application thereof, and extreme cost reduction is required from materials to manufacturing methods. Therefore, the present method is suitable when the carbon fiber composite material, particularly the carbon fiber reinforced resin, is a material to be inspected. Particularly, among carbon fiber reinforced resins, an in-plane isotropic base material has high practicability in which the carbon fibers as discontinuous fibers are two-dimensionally randomly oriented and contained in a thermoplastic resin matrix. Therefore, the present method is suitable for manufacturing an in-plane isotropic base material, manufacturing a molded body using the same, and inspecting an in-process intermediate at that time. Examples of such an in-plane isotropic base material and a method for manufacturing the same include those described in U.S. Pat. Nos. 8,946,342, 8,829,103, 9,193,840, 9,545,760, and 9,909,253.

Particularly, when it is desired to define strictly and numerically the two-dimensional random orientation of a reinforcing fiber such as a carbon fiber in the material to be inspected, as disclosed in Japanese Patent No. 5,944,114, with respect to the reinforcing fiber, a state in which a plane orientation degree σ defined by plane orientation degree σ=100×(1−(number of reinforcing fibers having a plane orientation angle γ of 10° or more)/(a total number of reinforcing fibers)) is 90% or more may be used as a preferable two-dimensional random orientation.

Example

Examples are shown below, but the present invention is not limited thereto. Each value in the present examples was determined in accordance with the following method.
(1) Ultrasonic Inspection Method and Quality Determination Reference Therefor As described below, in the ultrasonic inspection method for confirming the presence or absence of voids, peeling, and the like in the material to be inspected, it was confirmed whether attenuation of ultrasound waves due to refraction was suppressed and proper ultrasonic inspection was performed. As the inspection method, the following inspection methods (1-1) to (1-3), which change the presence or absence of movement and the moving direction for the material to be inspected, the ultrasonic probe, and the fluid blowing port, were appropriately used.

An ultrasonic inspection device includes a pair of ultrasonic probes (one ultrasonic transmitting probe and one receiving probe), a mechanism (scanner) that moves the probe to an optional inspection location, a data analysis and image processing device, and wiring that connects them. As the ultrasonic inspection device, in the present example, a non-contact air coupled ultrasonic inspection system NAUT 21 of Japan Probe Corporation was used.

Figure 3:
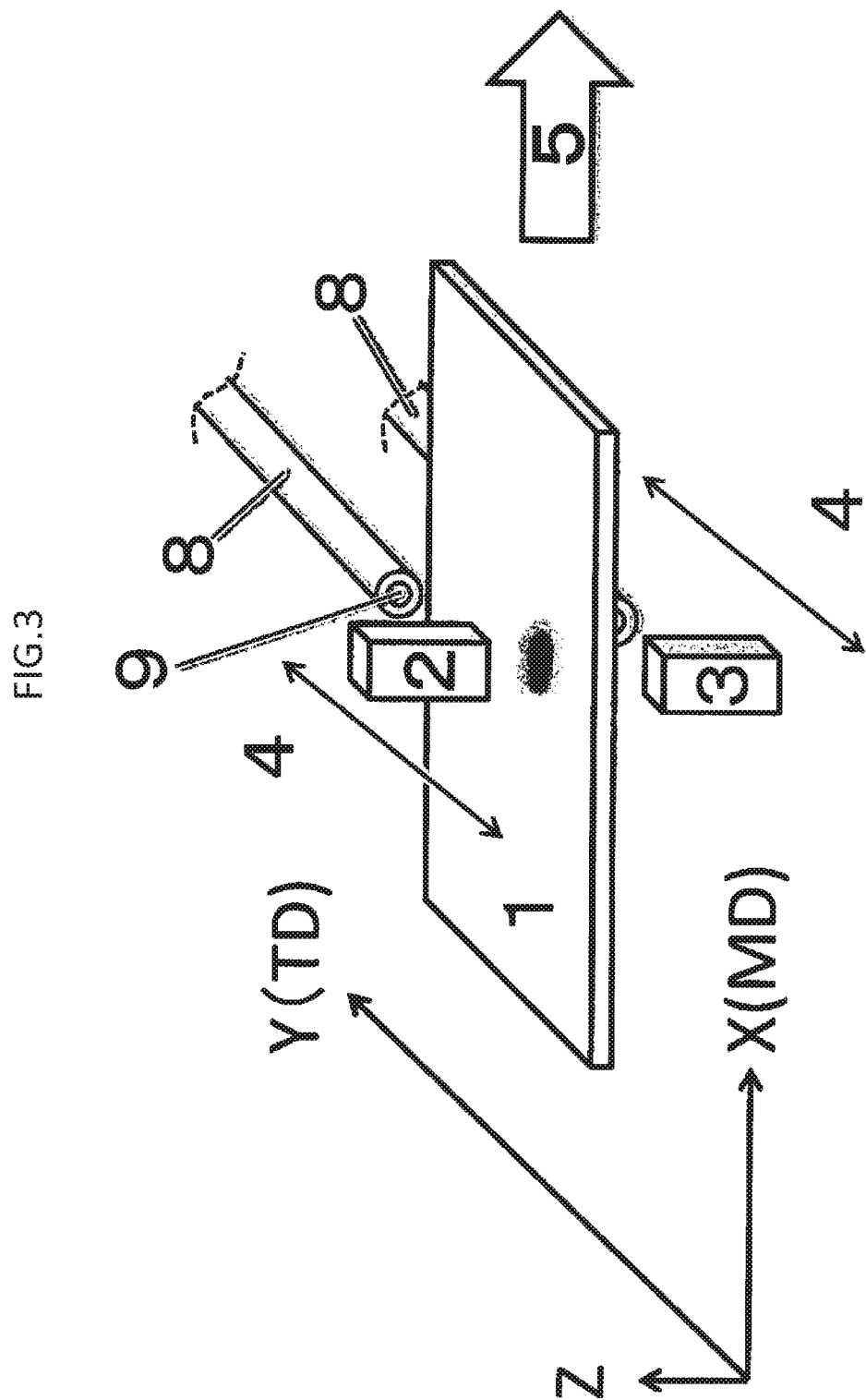
FIG. 3 is a schematic diagram illustrating an example of arrangement and moving direction of the material to be inspected and the ultrasonic probes in a case where inspection using ultrasound waves in a process 301 is performed on the rectangular sample at the same time as a process 201 or after the process 201. Also in this drawing, illustration of a part of devices is omitted as in FIG. 1.

In performing the ultrasonic inspection, the material to be inspected, one pair of ultrasonic probes (one ultrasonic transmitting probe and one receiving probe), and a fluid blow equipment are arranged in a form whose outline is illustrated in the schematic diagram of FIG. 3.

Although not illustrated in FIG. 3, the material to be inspected is fixed on a square-shaped platform having a large rectangular hole in a center portion as viewed in a thickness direction of a rectangular plate, with nip rollers nipping a front end and a rear end thereof in the MD direction, that is, two end portions at a Y axis side and a transporting direction side. Further, as a device that detects an ambient temperature of the location where the ultrasonic inspection is to be performed and a surface temperature of the material to be inspected, a K thermocouple (code 0.2×1P K−2−H−J2, that is, conductor outer diameter 0.2 mm, 1 pair, K thermocouple tolerance class 2, glass braid insulation, and JIS division 2 identified) manufactured by Ninomiya Electric Cable Co., Ltd., a temperature voltage measurement unit NR-TH08 manufactured by Keyence Corporation, and multi-input data logger NR-600 manufactured by Keyence Corporation were used in combination, a detection end of the K thermocouple were attached to a measurement location, and the temperature at the time of inspection was measured and recorded.

Both of the ultrasonic probes for transmission/reception were disposed so as to be substantially perpendicular to a planar portion of the material to be inspected, and distances between the ultrasonic probes and the surface of the material to be inspected were appropriately set for each example.

Ultrasound waves were transmitted from the ultrasonic probe (for transmitting) and irradiated on the material to be inspected, the ultrasound waves propagated through the material to be inspected were received by the ultrasonic probe for receiving, and an echo intensity of the ultrasound waves was measured. A measurement result was analyzed and converted into an image or a graph by a processing terminal of the ultrasonic inspection device. Based on the result, an occurrence state of attenuation of the ultrasound waves due to refraction in the echo intensity measurement result was confirmed. The transmission performance of the ultrasound waves with respect to the material to be inspected is affected by the temperature of the material to be inspected. Therefore, with respect to a higher temperature range that the temperature of the material to be inspected can reach at the time of inspection, a correction formula for ultrasonic sensitivity was created in advance with reference to a non-defective standard sample of the material to be inspected at about 30° C., and in the actual inspection, the inspection data was corrected with the correction formula to obtain an inspection result.

Regarding a degree of attenuation of the ultrasound waves due to refraction in the echo intensity measurement result, 5-point moving maximum values of the waveform peak (that is, received echo intensity) in the A-scope were plotted to obtain a waveform diagram as illustrated in FIG. 7A or FIG. 7B, a proportion of time at which a remarkable decrease in the echo intensity that probably occurred due to refraction of the ultrasound wave is observed was calculated in percentage per unit time and taken as a refractive attenuation rate, and the evaluation was performed as follows.

Perfect: a refractive attenuation rate per hour of 0.05% or less

Excellent: a refractive attenuation rate per hour of more than 0.05% and 0.5% or less Good: a refractive attenuation rate per hour of more than 0.5% and 1.5% or less Bad: a refractive attenuation rate per hour of more than 1.5%.

In one example, a fluid, such as air, from the fluid blow equipment was blown to spaces between the ultrasonic probes and the material to be inspected at a predetermined flow velocity (wind velocity). Although illustrated in a simplified form in FIG. 3, the fluid blow equipment also includes a spot cooler, an air compression equipment, a fluid supply source such as a water supply, a device (such as an airflow meter) that controls a supply amount and a supply rate (wind velocity) of the fluid, and piping that carries the fluid from the fluid supply source. The piping was of a flexible hose shape, and a terminal of the piping was a fluid blowing port. In some examples, a nozzle was provided at a tip end on the piping discharging side, and a discharge port of the nozzle was taken as a fluid blowing port.

The fluid blowing may be performed with respect to both faces of the material to be inspected, that is, with respect to a space between the ultrasonic transmitting probe and the material to be inspected and a space between the ultrasound wave receiving probe and the material to be inspected, and may be performed with respect to either one of the spaces. Further, the fluid blowing may be performed on the surface of the material to be inspected and may be performed in a region 10 mm away from the material surface.

In the present example, a blow angle of the fluid is represented by a numerical value between 0 degree and 90 degrees with reference to the surface of the material to be inspected. An angle at which the fluid is blown in a horizontal direction of the surface is taken as 0 degree, and an angle at which the fluid is blown from a direction perpendicular to the surface is taken as 90 degrees. Further, the angle of fluid blown on the upper side of the material to be inspected (angle indicated by a reference numeral 11 in FIG. 4) was represented by a positive numerical value, and the angle of the fluid blown on the lower side of the material to be inspected (angle indicated by a reference numeral 12 in FIG. 4) was represented by a negative numerical value.

Regarding blowing of the fluid to the material to be inspected at the time of ultrasonic inspection, the Reynolds number Re calculated by using the following formula was determined, in which Uh (m/s) represents a horizontal component of a characteristic flow velocity of the fluid, L (m) represents a characteristic length that is a linear distance from the fluid blowing port to an end portion of the material to be inspected (end portion in the TD direction of FIG. 3, at a side where the fluid is blown), and v (m²/s) represents a coefficient of Kinematic viscosity of the fluid.

$$Re = Uh \times L / v$$

The characteristic flow velocity of the fluid was measured using an airflow meter that was disposed such that a detection end thereof was positioned in the vicinity of the surface of the material to be inspected.

In some embodiments, the material to be inspected immediately after being heated had a temperature higher than the ambient temperature of the location where the ultrasonic inspection was performed. A value obtained by subtracting the ambient temperature from the surface temperature of the material to be inspected at the time of ultrasonic inspection was taken as a "temperature difference" in the present embodiment alone. Unless otherwise specified, the ultrasonic inspection was performed in a state where the ambient temperature was controlled at 23° C.±1° C.

(1-1) Inspection Method 1 (Inspection of Stationary Material to be Inspected Placed at Predetermined Position)

The ultrasonic device described above was used, and the material to be inspected, the one pair of ultrasonic probes (one ultrasonic transmitting probe and one receiving probe), and the fluid blow equipment were arranged in the form whose outline was illustrated in the schematic diagram of FIG. 3. The one pair of ultrasonic probes and one pair of fluid blowing ports were disposed, by using a drive device and a metal frame, so as to nip the material to be inspected in a C shape as viewed from the MD direction. The fluid blowing ports are fixed so as to be capable of supplying the fluid to the two surfaces of the material to be inspected, which are on a Z axis of the ultrasonic probes, while the ultrasonic probes were moving, and the fluid blow equipment is also synchronized with the ultrasonic probes. The ultrasonic probes and the fluid blowing ports were attached to the metal frame and a biaxial drive device which was capable of moving the ultrasonic probes in the MD direction after moving the ultrasonic probes to an end portion in the TD direction.

The material to be inspected was fixed and held on the square-shaped platform, and the ultrasonic inspection was performed. Specifically, the ultrasonic probes in a state of being transmitting and receiving the ultrasound waves were moved at a speed of 1000 mm/s in the TD direction in a range of a width of 5 mm from an end in the MD direction of the material to be inspected illustrated in FIG. 3, that is, ultrasonic irradiation was performed while traversing. When the ultrasonic irradiation was performed to an end of the range in the TD direction, the ultrasonic probes were moved in the MD direction, and the ultrasonic irradiation was performed while moving the ultrasonic probes in a direction opposite to the TD direction in a next range of a width of 5 mm similarly. This operation was repeated until reaching a trailing end in the MD direction of the material to be inspected, that is, the planar portion of the material to be inspected was subjected to the ultrasonic irradiation, and a result thereof was analyzed and converted into an image. In the present inspection method, although the material to be inspected was subjected to the ultrasonic inspection in a stationary state, the inspection method was described using the MD direction and the transporting direction (reference numeral 5) of the material to be inspected of FIG. 3 for the sake of convenience.

(1-2) Inspection Method 2 (Inspection of Material to be Inspected Moving in MD Direction)

The inspection method 2 is the same as the inspection method 1 except that the holding of the material to be inspected was implemented by nipping two ends thereof in the MD direction with nip rolls instead of using the square-shaped platform, and further that the fluid blowing and the ultrasonic inspection were performed while rotating the nip rolls to transport the material to be inspected at a speed of 0.3 m/min in the MD direction.

(1-3) Inspection Method 3 (Inspection of Material to be Inspected Moving in MD Direction)

The present inspection method for performing operations is the same as the inspection method 2 except for the following 2 points. A concept of a positional relationship and moving directions of the material to be inspected, the ultrasonic probes, and the fluid blowing ports in the present inspection method is illustrated in FIG. 5. However, for simplification of the drawings, illustration of a gantry or a single-axis robot attached to the gantry is omitted. Regarding an arrangement of 5 pairs of ultrasonic probes and an arrangement of 1 pair of fluid blowing ports having a sufficient width capable of replacing air at surfaces of the material to be inspected to be inspected by the 5 pairs of ultrasonic probes, the 5 pairs of ultrasonic probes were arranged as if to thrust in the material to be inspected from above and below as viewed from the MD direction, and a single-axis robot capable of moving both the fluid blowing ports above and below the material to be inspected in the TD direction in accordance with the ultrasonic probes was used for the arrangement. The fluid blowing to the material to be inspected and the ultrasonic inspection were performed while moving the fluid blowing ports in accordance with the movement of the ultrasonic probes in the TD direction with the predetermined positional relationship maintained.

In order to irradiate an entire surface of the material to be inspected with ultrasound waves, the inspection is performed only when the ultrasonic probes move in a positive direction of a Y direction during reciprocation in the TD direction. One pair of ultrasonic probes can inspect a width of 5 mm, that is, a width of 25 mm can be inspected by one-way movement in the TD direction when 5 pairs of ultrasonic probes are provided. The material to be inspected moves 25 mm in the MD direction while the ultrasonic probes reciprocate once to inspect the width of 25 mm. At a moment when the movement of 25 mm in the MD direction is completed, the ultrasonic probes, which have finished one reciprocation and waits for a next inspection, starts the next one reciprocation in order to inspect the next width of 25 mm By repeating the above procedure, the inspection was performed in a state where the material to be inspected and the ultrasonic probes were moved, the ultrasonic irradiation was performed on the planar portion of the material to be inspected, and a result thereof was analyzed and converted into an image.

[Manufacture Example 1] Preparation of Material to be Inspected that is Composite Material With the following method according to a method for manufacturing a fiber-reinforced composite material disclosed in U.S. Pat. No. 8,946,342, three types of materials to be inspected, which were a carbon fiber reinforced thermoplastic resin (composite material) being a flat plate-shaped in-plane isotropic base material containing carbon fibers and nylon 6 (polyamide 6) resin as a matrix, and which had thicknesses of 0.3 mm, 0.5 mm, and 2.65 mm, respectively were prepared.

As a reinforcing fiber, a PAN-based carbon fiber "Tenax (registered trademark)" STS40-24KS (average fiber diameter 7 μm, number of filaments 24000, density about 1.750 g/cm$^3$) manufactured by Teijin Limited was widened and cut to an average fiber length of 30 mm, and as a thermoplastic resin, a particulate of nylon 6 resin A1030 (density: 1.130 g/cm$^3$) manufactured by Unitika Ltd. was used. These two were mixed such that a volume ratio of the carbon fibers with respect to a combined volume of the carbon fibers and the nylon 6 resin was 35%, the mixture was dispersed to form a mat-like material, and the mat-like material was heated and compressed at a pressure of 2.0 MPa for 5 minutes by a press machine heated to 280° C. to prepare a flat plate-shaped composite material in which the carbon fibers were two-dimensionally randomly oriented in the in-plane direction in a matrix of nylon 6 resin. The carbon fibers in the composite material were a mixture of carbon fibers having different numbers of filaments.

The composite material, cut to a length of 200 mm and a width of 200 mm, was used as a material to be inspected in the following specific examples and comparative examples.

[Manufacture Example 2] Preparation of Material to be Inspected that is Aluminum Plate An aluminum flat plate material (thickness: 0.5 mm) made of pure aluminum A1050, cut to a length of 200 mm and a width of 200 mm, was used as a material to be inspected in the following specific examples and comparative examples.

[Manufacture Example 3] Preparation of Material to be Inspected that is Stainless Steel Plate A flat plate material (thickness: 0.3 mm) made of SUS430, cut to a length of 200 mm and a width of 200 mm, was used as a material to be inspected in the following specific examples and comparative examples.

Example 1

A material to be inspected, which was a composite material containing a carbon fiber and a thermoplastic resins and which was obtained in the manufacture example 1, was arranged together with the fluid blowing ports and the ultrasonic probes in the form outlined in the schematic diagram of FIG. 3, and thereafter the ultrasonic inspection was performed using ultrasound waves having a frequency of 600 kHz in accordance with an inspection method in which the process 201 (fluid blowing) and the process 301 (ultrasonic inspection) according to the procedure of the above-described inspection method 1 were performed at the same time.

At a time point when the fluid blowing in the process 201 was started, a surface temperature of the material to be inspected was 15° C. higher than an ambient temperature due to residual heat during manufacturing. This temperature difference was less than 5° C. as a result of fluid blowing.

A specific arrangement of the ultrasonic probe in the ultrasonic inspection will be described below. To not bring the ultrasonic probes into contact with the material to be inspected, two probes are arranged such that the transmitting probe has a vertical distance of 30 mm from an upper surface of the material to be inspected and the receiving probe has a vertical distance of 30 mm from a lower surface of the material to be inspected, and a shaft portion of the receiving probe coincides with a shaft portion of the transmitting probe in the vertical direction.

Regarding the fluid blowing of the process 201, air drawn from a compressed air equipment was discharged through flexible tubing from a coolant liner P-CL-2N 11 (¼ swivel nozzle I), which served as a fluid blowing port and was disposed at a position where a linear distance (characteristic length L (m)) to an end portion of the material to be inspected was 0.01 m, and was blown to upper and lower surfaces of the material to be inspected. Specifically, at a space between an upper face of the material to be inspected and the transmitting probe, the fluid blowing was performed such that, at an angle of +30 degrees with respect to the surface of the material to be inspected (hereinafter, may be referred to as a material surface), the air hit the material surface that was not right below but in the vicinity of the transmitting probe, and at a portion that was right below the transmitting probe on the surface of the material to be inspected, the air flow was substantially parallel to the surface of the material to be inspected and further a wind velocity component in the substantially parallel direction was 5 m/s. Similarly for the lower surface of the material to be inspected, at a space between a lower face thereof and the receiving probe, the fluid blowing was performed such that, at an angle of −30 degrees with respect to the material surface, air hit the material surface that was not right above but in the vicinity of the receiving probe, and at a portion that was right above the receiving probe on the surface of the material to be inspected, the air flow was substantially parallel to the surface of the material to be inspected and further the wind velocity component in the substantially parallel direction was 5 m/s. In fluid blowing on either the upper side or the lower side of the material to be inspected, the wind velocity (horizontal wind velocity component) Uh was 5 m/s, the characteristic length L was 0.01 m, and the coefficient of Kinematic viscosity of air as the fluid was $1.51 \times 10^{-5}$ (m$^2$/s), and therefore the Reynolds number of the fluid blowing was $3.31 \times 10^3$.

In the ultrasonic inspection of the process 301 performed at the same time as the process 201 (fluid blowing), refractive attenuation was insignificant in the echo intensity measurement result, and an evaluation result was Excellent.

In comparative example 1 to be described below, which had the same conditions except that the fluid blowing was not performed, the refractive attenuation of the echo intensity was highly frequent because, at the time of ultrasonic inspection, the surface temperature of the material to be inspected was higher than the ambient temperature and a different atmosphere layer (here, an air layer having a temperature higher than the ambient temperature) was generated in a region within 3 mm from the surface of the material to be inspected to the outside of the material to be inspected. In the present example, by performing the fluid blowing, an atmosphere of at least the space between the ultrasonic irradiation probe and a portion subjected to the ultrasonic irradiation, on the surface of the material to be inspected was replaced, that is, a different atmosphere layer was removed and a fluid atmosphere region was formed, and it was considered that the refractive attenuation was suppressed as a result in the measurement result of the echo intensity.

Example 2

Operations were performed under the same conditions as in Example 1 except that a surface temperature of a material to be inspected at a time point when fluid blowing in the process 201 was started was higher than an ambient temperature by 5° C. instead of 15° C. Refractive attenuation shown in an echo intensity measurement result of an ultrasonic inspection was insignificant, and an evaluation result was Excellent.

Example 3

Same operations were performed as in Example 1 except that a surface temperature of a material to be inspected at the time when fluid blowing in the process 201 was started was higher than an ambient temperature by 50° C. instead of 15° C., and that the surface temperature of the material to be inspected after the fluid blowing was higher than the ambient temperature by 5° C. or more. Refractive attenuation shown in an echo intensity measurement result in an ultrasonic inspection was insignificant, and an evaluation result was Excellent.

Example 4

Same operations were performed as in Example 1 except that fluid blowing to a surface of a material to be inspected in the process 201 was only performed on an upper face of the material to be inspected. Refractive attenuation shown in an echo intensity measurement result in an ultrasonic inspection was slight, and an evaluation result was Good.

Example 5

Same operations were performed as in Example 1 except that fluid blowing to a surface of a material to be inspected in the process 201 was performed such that, on either an upper face or a lower face of the material to be inspected, a wind velocity component in a direction parallel to the surface of the material to be inspected was 3 m/s, that is, a quasi-Reynolds number of the fluid blowing was $1.99 \times 10^3$. Refractive attenuation shown in an echo intensity measurement result in an ultrasonic inspection was slight, and an evaluation result was Good.

Example 6

Same operations were performed as in Example 1 except that fluid blowing to a surface of a material to be inspected in the process 201 was performed such that, on either an upper face or a lower face of the material to be inspected, a wind velocity component in a direction parallel to the surface of the material to be inspected was 10 m/s, that is, a quasi-Reynolds number of the fluid blowing was $6.62 \times 10^3$. Refractive attenuation shown in an echo intensity measurement result in an ultrasonic inspection was insignificant, and an evaluation result was Excellent.

Example 7

Same operations were performed as in Example 1 except that an angle of fluid blowing to a surface of a material to be inspected in the process 201 was changed as follows. Refractive attenuation shown in an echo intensity measurement result in an ultrasonic inspection was insignificant, and an evaluation result was Excellent.

At the time of performing the fluid blowing to a space between an upper face of the material to be inspected and a transmitting probe such that air as a fluid flowed substantially parallel to the surface at a portion of the material surface which was right below the transmitting probe, the angle of fluid blowing with respect to the material surface was set to +45 degrees.

At the time of performing the fluid blowing to a space between a lower face of the material to be inspected and a receiving probe such that air as a fluid flowed substantially parallel to the surface at a portion of the material surface which was right above the transmitting probe, the angle of fluid blowing with respect to the material surface was set to −45 degrees.

Example 8

Same operations were performed as in Example 1 except that the aluminum plate obtained in manufacture example 2, instead of the composite material containing a carbon fiber and a thermoplastic resin and obtained in manufacture example 1, was used as a material to be inspected and heated such that a surface temperature thereof was higher than an ambient temperature of a location where an ultrasonic inspection was to be performed by 15° C. Refractive attenuation shown in an echo intensity measurement result in the ultrasonic inspection was almost none, and an evaluation result was Perfect.

Example 9

Same operations were performed as in Example 1 except that the stainless steel plate obtained in manufacture example 3, instead of the composite material containing a carbon fiber and a thermoplastic resin and obtained in manufacture example 1, was used as a material to be inspected and heated such that a surface temperature thereof was higher than an ambient temperature of a location where an ultrasonic inspection was to be performed by 15° C. Refractive attenuation shown in an echo intensity measurement result in the ultrasonic inspection was almost none, and an evaluation result was Perfect.

Example 10

In the present example, ultrasonic inspection of the process 301 was performed after fluid blowing of the process 201. The fluid blowing of the process 201 was performed in accordance with the operations of Example 1. However, the following were different from those in Example 1: instead of mere air, air containing mist-like water was used as a fluid; the fluid blowing was only performed on an upper face of the material to be inspected; a difference between surface temperature of the material to be inspected and an ambient temperature at a time point when the fluid blowing in the process 201 was started was 50° C. instead of 15° C.; and the ultrasonic inspection of the process 301 was performed after the difference between the surface temperature of the material to be inspected and the ambient temperature was made to 2° C. or less by the fluid blowing.

The process 301 was also performed in accordance with the operations of Example 1. However, the following were different from those in Example 1: the material to be inspected in a state of having a temperature higher than the ambient temperature by 2° C. or less by receiving the fluid blowing of the process 201 in advance was irradiated with ultrasound waves; and the fluid blowing was not performed at the time of ultrasonic irradiation. Refractive attenuation shown in an echo intensity measurement result in the ultrasonic inspection was almost none, and an evaluation result was Perfect.

Example 11

Operations were performed under the same conditions as in Example 1 except that a frequency of ultrasound waves used in the inspection of the process 301 was set to 400 kHz instead of 600 kHz. Refractive attenuation shown in an echo intensity measurement result in an ultrasonic inspection was slight, and an evaluation result was Good.

Example 12

Operations were performed under the same conditions as in Example 1 except that a frequency of ultrasound waves used in the inspection of the process 301 was set to 1000 kHz instead of 600 kHz. Refractive attenuation shown in an echo intensity measurement result in an ultrasonic inspection was slight, and an evaluation result was Good.

Example 13

Operations were performed under the same conditions as in Example 1 except the following: instead of inspection method 1, inspection method 2 was performed, that is, fluid blowing and ultrasonic inspection were performed while a material to be inspected was being transported at a speed of 0.3 m/min in an MD direction; and a surface temperature of the material to be inspected at a time point when the fluid blowing of the process 201 was started was higher than an ambient temperature by 50° C. instead of 15° C. Refractive attenuation shown in an echo intensity measurement result in the ultrasonic inspection was almost none, and an evaluation result was Perfect.

Example 14

Operations were performed under the same conditions as in Example 1 except the following: instead of inspection method 1, inspection method 3 was performed, that is, fluid blowing and ultrasonic inspection were performed while a material to be inspected was being transported at a speed of 1.5 m/min in an MD direction and fluid blowing ports were also being moved in accordance with movement in a TD direction and the MD direction of ultrasonic probes; with a predetermined positional relationship maintained; and surface temperature of the material to be inspected at a time point when the fluid blowing of the process 201 was started was higher than an ambient temperature by 50° C. instead of 15° C. Refractive attenuation shown in an echo intensity measurement result in the ultrasonic inspection was almost none, and an evaluation result was Perfect.

Comparative Example 1

Operations were performed under the same conditions as in Example 1 except that the process 201 (fluid blowing) was not performed and that there was no occurrence that a difference between a surface temperature of a material to be inspected and an ambient temperature was less than 5° C. Refractive attenuation shown in an echo intensity measurement result in an ultrasonic inspection was frequent, and an evaluation result was Bad.

Comparative Example 2

Operations were performed under the same conditions as in example 2 except that the process 201 (fluid blowing) was not performed. Refractive attenuation shown in an echo intensity measurement result in an ultrasonic inspection was frequent, and an evaluation result was Bad.

Comparative Example 3

Operations were performed under the same conditions as in Example 1 except the following: fluid blowing to an upper surface of a material to be inspected was performed at 0 degree with respect to a material surface thereof and fluid blowing to a lower surface was performed at an angle of 0 degree with respect to the material surface, but the fluid flow through a position 10 mm away from either the upper surface or the lower surface. Refractive attenuation shown in an echo intensity measurement result in an ultrasonic inspection was frequent, and an evaluation result was Bad.

Comparative Example 4

Operations were performed under the same conditions as in Example 1 except the following: fluid blowing to a surface of a material to be inspected in the process 201 was performed without suing a swivel nozzle; and the fluid blowing was performed such that, on either an upper face or a lower face of the material to be inspected, a wind velocity component in a direction parallel to the surface of the material to be inspected was 10 m/s and a characteristic length L was 2 m, that is, the fluid blowing was performed with a large turbulent fluid having a Reynolds number of $1.32 \times 10^6$. Refractive attenuation shown in an echo intensity measurement result in an ultrasonic inspection was frequent, and an evaluation result was Bad.

Comparative Example 5

Operations were performed under the same conditions as in Example 1 except the following: fluid blowing to an upper surface of a material to be inspected was performed at +80 degrees with respect to a material surface thereof and fluid blowing to a lower surface was performed at an angle of −80 degrees with respect to the material surface, and at a portion right below a transmitting probe on the upper surface of the material to be inspected and at a portion right above a receiving probe on the lower surface of the material to be inspected, a direction of an airflow was nearly perpendicular to the surface of the material to be inspected. In an echo intensity measurement result in an ultrasonic inspection, there were many valley portions having depths of different levels from that of attenuation due to the refraction of the ultrasound wave, and an evaluation result was Bad.

Reference Example 1

Same operations were performed as in Example 1 except the following: as a material to be inspected, the composite material containing a carbon fiber and a thermoplastic resin and obtained in manufacture example 1 was used; and the ultrasonic inspection in the process 301 was performed, without the process 201 being performed, in a state where the material to be inspected was cooled until a surface temperature thereof was same as an ambient temperature of a location where the ultrasonic inspection was performed. Refractive attenuation shown in an echo intensity measurement result in the ultrasonic inspection was almost none, and an evaluation result was Perfect.

Reference Example 2

Same operations were performed as in Example 1 except the following: the aluminum plate (thickness: 0.5 mm) made of pure aluminum A1050 and obtained in manufacture example 2 was used as a material to be inspected; and the ultrasonic inspection in the process 301 was performed, without the process 201 being performed, in a state where a surface temperature of the material to be inspected was same as an ambient temperature of a location where the ultrasonic inspection was performed. Refractive attenuation shown in an echo intensity measurement result in the ultrasonic inspection was almost none, and an evaluation result was Perfect.

Reference Example 3

Same operations were performed as in Example 1 except the following: the flat plate material (thickness: 0.3 mm) made of SUS430 and obtained in manufacture example 3 was used as a material to be inspected; and the ultrasonic inspection in the process 301 was performed, without the process 201 being performed, in a state where a surface temperature of the material to be inspected was same as an ambient temperature of a location where the ultrasonic inspection was performed. Refractive attenuation shown in an echo intensity measurement result in the ultrasonic inspection was almost none, and an evaluation result was Perfect.

Reference Example 4

Operations were performed under the same conditions as in Example 1 except the following: as a material to be inspected, the composite material containing a carbon fiber and a thermoplastic resin and obtained in manufacture Example 1 was used; and the ultrasonic inspection of the process 301 was performed, without fluid blowing of the process 201 being performed, in a state where a surface temperature of the material to be inspected was higher than an ambient temperature of a location where the ultrasonic inspection was performed by 2° C. instead of 15° C. Refractive attenuation shown in an echo intensity measurement result in an ultrasonic inspection was insignificant, and an evaluation result was Excellent.

Reference Example 5

Same operations were performed as in Example 1 except the following: as a material to be inspected, the composite material containing a carbon fiber and a thermoplastic resin and obtained in manufacture example 1 was used; and the ultrasonic inspection in the process 301 was performed, without the process 201 being performed, in a state where the material to be inspected was cooled until a surface temperature thereof was same as an ambient temperature of a location where the ultrasonic inspection was performed, and in a state where ultrasonic probes at an upper face side and a lower face side of the material to be inspected were brought into contact with the surface of the material to be inspected. Refractive attenuation shown in an echo intensity measurement result in an ultrasonic inspection was slight, and an evaluation result was Good.

Reference Example 6

Operations were performed under the same conditions as in Example 1 except the following: as a material to be inspected, the composite material containing a carbon fiber and a thermoplastic resin and obtained in manufacture example 1 was used; a surface temperature of the material to be inspected was higher than an ambient temperature of a location where the ultrasonic inspection was performed by 2° C. instead of 15° C.; fluid blowing of the process 201 was not performed; and a frequency of ultrasound waves used in the process 301 was 200 kHz instead of 600 kHz. Refractive attenuation shown in an echo intensity measurement result in the ultrasonic inspection was slight, and an evaluation result was Good.

Reference Example 7

Operations were performed under the same conditions as in Example 1 except the following: as a material to be inspected, the composite material containing a carbon fiber and a thermoplastic resin and obtained in manufacture example 1 was used; a surface temperature of the material to be inspected was higher than an ambient temperature of a location where the ultrasonic inspection was performed by 2° C. instead of 15° C.; fluid blowing of the process 201 was not performed; and a frequency of ultrasound waves used in the process 301 was 3000 kHz instead of 600 kHz. In the ultrasonic inspection, attenuation of the ultrasound waves due to air was large, and a quality determination cannot be performed.

INDUSTRIAL APPLICABILITY

The method disclosed herein is suitable for ultrasonic inspection of various kinds of materials to be inspected, and is industrially very useful. Particularly, with the method, a quality determination can be performed highly accurately and quickly on manufacturing, molding and processing process, and use of a resin-based material or a metal material. Most especially, the method of the present invention is suitable for inspection and manufacture of automobiles and related parts and members, which are required to provide high quality products with extremely high productivity.

Although the present invention has been described in detail using specific examples, it will be apparent to those skilled in the art that various modifications and variations are possible without departing from the spirit and scope of the present invention.

This application is based on Japanese Patent Application No. 2018-043048 filed on Mar. 9, 2018, the contents of which are incorporated herein by reference.

REFERENCE SIGNS LIST

1: material to be inspected
2: ultrasonic probe (for transmitting ultrasound wave)
3: ultrasonic probe (for receiving ultrasound wave)
4: moving direction of ultrasonic probe
5: transporting direction of material to be inspected
6: different atmosphere layer
7: ultrasound wave
8: fluid blowing equipment
9: fluid blowing port
10: fluid
11: angle of blow direction (upper face)
12: angle of blow direction (lower face)
13: coupling arm

The invention claimed is:
1. An inspection method for confirming voids, peeling, foreign matter contamination, unintended uneven distribution of constituent components in a material to be inspected using ultrasound waves, comprising following processes 201 and 301:
process 201: blowing a fluid through a blowing port onto a part of a surface of the material to be inspected, wherein an angle of a direction of the fluid blown onto the part of the surface of the material to be inspected is within ±45° but not within ±3° with reference to the surface of the material to be inspected, and then a flow of the fluid is deflected to be a substantially parallel flow in which the fluid flows in a direction within ±3° with reference to the surface; and
process 301: inspecting the material to be inspected using the ultrasound waves after the process 201 or at a same time as the process 201,
wherein
the process 201 is performed in a condition where:
a surface temperature of a material to be inspected—an ambient temperature>2° C., and
inspection using ultrasound waves in the process 301 is a non-contact air coupled inspection in which the ultrasound waves propagate in the fluid in the substantially parallel flow to a portion on the surface of the material to be inspected, the portion being away from a position of the part where the fluid is blown in the process 201, and the inspection satisfies:
a refractive attenuation rate in echo intensity measurement≤1.5%.
2. The inspection method according to claim 1,
wherein the angle of the direction of the fluid blown onto the part of the surface of the material to be inspected is within ±35° but not within ±3° with reference to the surface of the material to be inspected.
3. The inspection method according to claim 1,
wherein the inspection using ultrasound waves in the process 301 includes:
arranging at least one pair of ultrasonic probes facing each other with the material to be inspected in between without contacting the material to be inspected;
transmitting the ultrasound waves from one of the ultrasonic probes; and
receiving the transmitted ultrasound waves with the other ultrasonic probe.
4. The inspection method according to claim 1,
wherein the ultrasound waves employed in the process 301 have a frequency of 100 kHz to 1000 kHz.
5. The inspection method according to claim 1,
wherein the fluid blown onto the part of the surface of the material to be inspected in the process 201 is at least one selected from a group consisting of air, water vapor, an inert gas, and mist-like water.
6. The inspection method according to claim 1,
wherein the processes 201 and 301 are performed at the same time, and
a difference between the surface temperature of the material to be inspected during inspection and the ambient temperature is 5° C. or more.
7. The inspection method according to claim 1,
wherein the material to be inspected is used in a condition of:
the surface temperature thereof—the ambient temperature>2° C., and
the process 201 includes: replacing at least a part of a different atmosphere layer in contact with the surface of the material to be inspected with the fluid blown onto the part of the surface of the material to be inspected in the process 201 to form a fluid atmosphere region, and the inspection using ultrasound waves in the process 301 is performed by propagating the ultrasound waves in the fluid atmosphere region.

8. The inspection method according to claim 7, wherein the at least part of the different atmosphere layer is replaced with the fluid in a region within 3 mm from the surface of the material to be inspected to form the fluid atmosphere region.

9. The inspection method according to claim 7, wherein the material to be inspected is used in a condition where:

the surface temperature thereof—the ambient temperature>2° C., and the material to be inspected has different atmosphere layers contacting one face of the material to be inspected and the other face of the material to be inspected opposite to the one face, the process 201 comprises blowing the fluid onto the part of the surface of the material to be inspected to replace at least a part of each different atmosphere layer with the fluid to form two or more fluid atmosphere regions thereon, and the inspection using ultrasound waves in the process 301 includes propagating the ultrasound waves from one fluid atmosphere region on one face to another fluid atmosphere region on the other face.

10. The inspection method according to claim 1, wherein the fluid blown onto the part of the surface of the material to be inspected in the process 201 has a flow velocity of 1 m/s or more in a direction parallel to the surface of the material to be inspected, and has a Reynolds number of 100,000 or less.

11. The inspection method according to claim 1, wherein the material to be inspected has a thickness of 0.1 mm or more.

12. The inspection method according to claim 1, wherein the material to be inspected is at least one selected from a group consisting of magnesium, aluminum, iron, a glass fiber reinforced thermosetting resin, a glass fiber reinforced thermoplastic resin, a carbon fiber reinforced thermosetting resin, and a carbon fiber reinforced thermoplastic resin.

13. The inspection method according to claim 1, wherein the material to be inspected has a substantially plate shape.

14. The inspection method according to claim 1, wherein the material to be inspected is continuously supplied to a location where the inspection is performed using the ultrasound waves in the process 301.

15. The inspection method according to claim 14, wherein ultrasonic probes are reciprocated in a width direction of the material to be inspected when the inspection using ultrasound waves in the process 301 is performed while the material to be inspected is continuously supplied, and the blowing port of the fluid is moved in accordance with movement of the ultrasonic probes when the process 301 is performed at the same time as the process 201.

16. The inspection method according to claim 1, wherein a difference between the surface temperature of the material to be inspected and the ambient temperature is 5° C. or more before the fluid is blown, and the fluid is blown onto the part of the surface of the material to be inspected until the difference decreases less than 5° C. in the process 201.

17. The inspection method according to claim 1, wherein the process 301 further comprises:

converting data of the inspection using ultrasound waves into an image for determining whether the material to be inspected may be used in a next process as a material or an in-process intermediate, or may be shipped and sold as a product.

18. The inspection method according to claim 1, wherein the processes 201 and 301 are performed at the same time.

19. A molding material manufacturing method, comprising inspecting the molding material as the material to be inspected using the inspection method according to claim 1.

* * * * *